US010995679B2

(12) United States Patent
Abe et al.

(10) Patent No.: US 10,995,679 B2
(45) Date of Patent: May 4, 2021

(54) GAS TURBINE COMBUSTOR, GAS TURBINE, AND CONTROL METHOD FOR GAS TURBINE COMBUSTOR

(71) Applicant: Mitsubishi Power, Ltd., Yokohama (JP)

(72) Inventors: Kazuki Abe, Tokyo (JP); Akinori Hayashi, Yokohama (JP); Yasuhiro Wada, Yokohama (JP); Tetsuma Tatsumi, Yokohama (JP); Shohei Yoshida, Yokohama (JP)

(73) Assignee: Mitsubishi, Power, Ltd., Yokohama (JP)

( * ) Notice: Subject to any disclaimer, the term of this patent is extended or adjusted under 35 U.S.C. 154(b) by 59 days.

(21) Appl. No.: 16/263,039

(22) Filed: Jan. 31, 2019

(65) Prior Publication Data

US 2019/0242581 A1  Aug. 8, 2019

(30) Foreign Application Priority Data

Feb. 6, 2018  (JP) .............................. JP2018-019368

(51) Int. Cl.
*F02C 9/28* (2006.01)
*F23R 3/34* (2006.01)
(Continued)

(52) U.S. Cl.
CPC .................. *F02C 9/28* (2013.01); *F23R 3/18* (2013.01); *F23R 3/20* (2013.01); *F23R 3/286* (2013.01);
(Continued)

(58) Field of Classification Search
CPC .. F02C 9/28; F02C 9/263; F02C 7/232; F23R 3/14; F23R 3/286; F23R 3/34; F23R 3/18
See application file for complete search history.

(56) References Cited

U.S. PATENT DOCUMENTS 5,319,936 A  6/1994  Ikeda et al.
5,327,718 A * 7/1994  Iwata ..................... F02C 7/228
                                            60/39.27
(Continued)

FOREIGN PATENT DOCUMENTS

EP  0 529 900 A1  3/1993
JP  2016-35358 A  3/2016
JP  2017180324 A * 10/2017 ............... F23R 3/28

OTHER PUBLICATIONS

Extended European Search Report issued in counterpart European Application No. 19154883.3 dated Jun. 12, 2019 (five pages).

*Primary Examiner* — Katheryn A Malatek
(74) *Attorney, Agent, or Firm* — Crowell & Moring LLP

(57) ABSTRACT

A flame produced within a premixer is promptly extinguished and a reduction in output power of a gas turbine associated with extinguishment is suppressed. In a gas turbine combustor including a diffusion burner and a premixed burner, the premixed burner is configured with a burner liner that surrounds the diffusion burner; a burner casing that surrounds the burner liner; a plurality of vanes that separate a cylindrical space between the burner liner and the burner casing into a plurality of premixers arranged side by side in a circumferential direction; a plurality of premixed fuel nozzles that inject a premixed fuel to the premixers; at least one thermometer installed to be buried in one of the vanes, and the like, and in a case in which a detection value of the thermometer exceeds a corresponding set value, an opening of each of premixed gas control valves is reduced and an opening of a diffusion gas control valve is increased in such a manner that a sum of flow rates of fuels supplied to the diffusion burner and the premixed burner remains unchanged.

11 Claims, 16 Drawing Sheets

(51) Int. Cl.
*F23R 3/20* (2006.01)
*F23R 3/28* (2006.01)
*F23R 3/18* (2006.01)
*F23R 3/14* (2006.01)

(52) U.S. Cl.
CPC ............... *F23R 3/343* (2013.01); *F23R 3/14* (2013.01); *F23R 2900/03343* (2013.01)

(56) References Cited

U.S. PATENT DOCUMENTS

| | | |
|---|---|---|
| 5,533,329 A | 7/1996 | Ohyama et al. |
| 5,575,153 A | 11/1996 | Ito et al. |
| 5,660,045 A | 8/1997 | Ito et al. |
| 2012/0055161 A1* | 3/2012 | Sekiguchi ............... F23N 1/002 60/737 |
| 2017/0130962 A1* | 5/2017 | Inoue ........................ F23R 3/16 |

* cited by examiner

GAS TURBINE COMBUSTOR, GAS TURBINE, AND CONTROL METHOD FOR GAS TURBINE COMBUSTOR

BACKGROUND OF THE INVENTION

1. Field of the Invention

The present invention relates to a gas turbine combustor, a gas turbine, and a control method for a gas turbine combustor.

2. Description of the Related Art

In recent years, further improvement in efficiency and reduction in nitrogen oxides (NOx) are required for a gas turbine equipped with a compressor, a combustor, a turbine, and the like to meet environmental conservation regulations and social demand. While there is known a method including increasing a temperature of a flame produced in a combustor to increase a temperature of combustion gas at an inlet of a gas turbine as a method of improving efficiency of the gas turbine, nitrogen oxides (NOx) emissions possibly increase to be associated with an increase in the temperature of the flame.

On the other hand, as a combustor that suppresses nitrogen oxides (NOx) emissions, there is known a combustor that adopts premixed combustion (hereinafter, referred to as "premixed combustor") (refer to JP-2016-035358-A). The premixed combustion is a combustion scheme for supplying air-fuel mixed gas produced by premixing a fuel and air in a premixer to a combustion chamber and burning the air-fuel mixture. The premixed combustion has an advantage in that supplying the fuel and the air after mixture of the fuel and the air to the combustion chamber makes the temperature of the flame produced within the combustion chamber uniform to suppress nitrogen oxides (NOx) emissions in the combustor.

In the premixed combustor, there often occurs a phenomenon (so-called flashback) that an increase in the temperature of the air mixed with the fuel or an increase in a content of hydrogen contained in the fuel causes an increase in a burning velocity, resulting in a back flow of the flame produced within the combustion chamber into a premixer. There also often occurs that a flying object accompanying the combustion air supplied from the compressor or the fuel supplied to the combustor is ignited, and that a flame is produced within the premixer. The back flow of the flame into the premixer occurs or the flame has been produced within the premixer for a factor of some sort causes the combustion gas to be heated, which possibly increases a heat load applied to a structure downstream of the premixer. In a case in which the flame has been produced within the premixer, the flame within the premixer can be extinguished by, for example, reducing a flow rate of a fuel for premixed combustion. To automate this extinguishment operation, it is necessary to detect that the flame has been produced within the premixer. Furthermore, simply reducing the flow rate of the fuel for premixed combustion to be associated with the extinguishment within the premixer causes a reduction in output power of the gas turbine.

SUMMARY OF THE INVENTION

An object of the present invention is to provide a gas turbine combustor, a gas turbine, and a control method for a gas turbine combustor that can promptly extinguish a flame produced within a premixer and suppress a reduction in output power of the gas turbine associated with extinguishment.

To attain the object, a gas turbine combustor according to the present invention is a gas turbine combustor including: a diffusion burner by a diffusion combustion scheme; a diffusion gas control valve provided in a diffusion fuel system for the diffusion burner; a premixed burner by a premixed combustion scheme; at least one premixed gas control valve provided in a premixed fuel system for the premixed burner; a combustion liner that forms a combustion chamber downstream, in a fuel injection direction, of the diffusion burner and the premixed burner; and a control device that controls the diffusion gas control valve and the premixed gas control valve, in which the premixed burner includes: a burner liner that surrounds the diffusion burner; a burner casing that surrounds the burner liner; a plurality of vanes that separate a cylindrical space between the burner liner and the burner casing into a plurality of premixers arranged side by side in a circumferential direction; a plurality of premixed fuel nozzles that are connected to the premixed fuel system and that inject a premixed fuel to the corresponding premixers; and at least one thermometer installed to be buried in one of the vanes, and in which the control device is configured, in a case in which a detection value of the thermometer or an increase rate of the detection value exceeds a corresponding set value, to execute premixed fuel ratio control to reduce an opening of the premixed gas control valve and to increase an opening of the diffusion gas control valve in such a manner that a sum of flow rates of fuels supplied to the diffusion burner and the premixed burner remains unchanged.

According to the present invention, it is possible to promptly extinguish a flame produced within a premixer, suppress a reduction in output power of a gas turbine associated with extinguishment, and ensure both reliability and operability of a gas turbine combustor.

DESCRIPTION OF THE PREFERRED EMBODIMENTS

Embodiments of the present invention will be described hereinafter with reference to the drawings.

First Embodiment

—Gas Turbine Plant—

Figure 1:
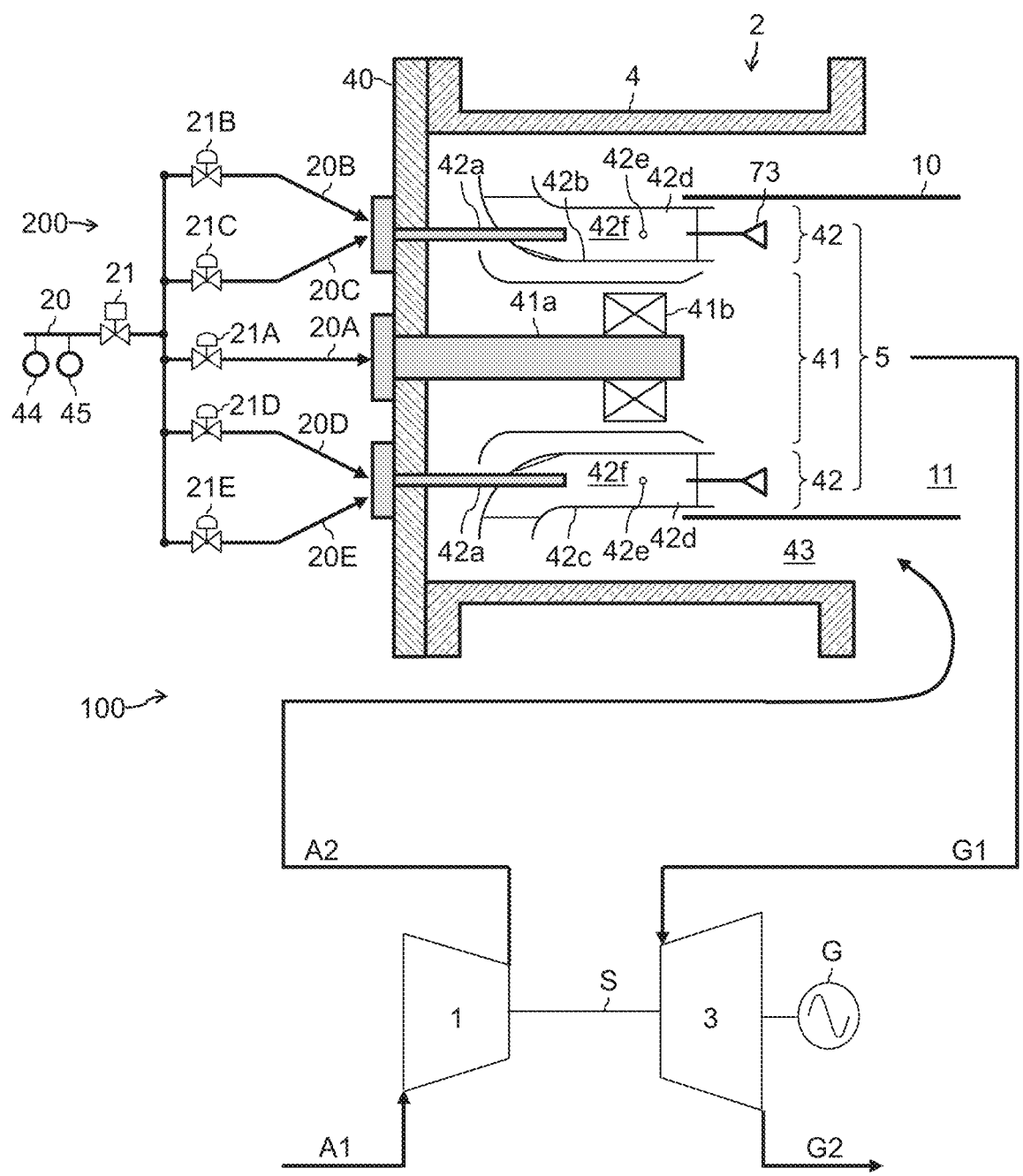
FIG. 1 is a schematic diagram representing an overall configuration of a gas turbine plant equipped with a gas turbine combustor according to a first embodiment of the present invention.
Figure 2:
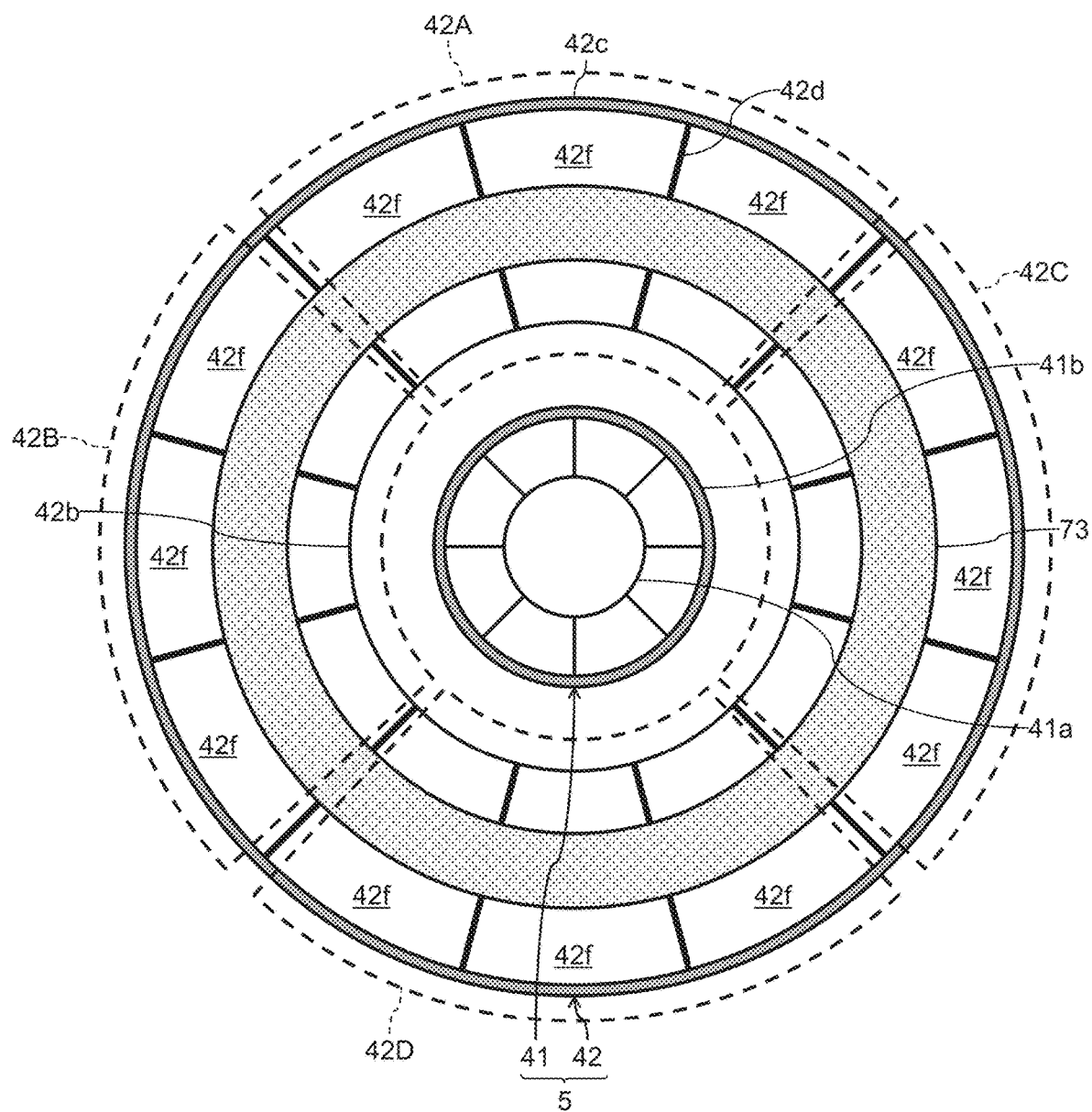
FIG. 2 depicts a burner viewed from a combustion chamber side and provided in the gas turbine combustor of FIG. 1.

FIG. 1 is a schematic diagram representing an overall configuration of a gas turbine plant equipped with a gas turbine combustor according to a first embodiment of the present invention, and FIG. 2 depicts a configuration of a burner viewed from a combustion chamber side. A gas turbine plant 100 depicted in FIG. 1 includes a generator G and a gas turbine that is a prime mover which drives the generator G. The gas turbine includes a compressor 1, a gas turbine combustor (hereinafter, referred to as "combustor") 2, and a turbine 3, and the compressor 1, the turbine 3, and the generator G are coupled to one another by a common shaft S.

The compressor 1 is driven by the turbine 3, and pressurizes air A1 taken in by suction via an air intake section (not depicted) to produce high-pressure air A2, and supplies the high-pressure air A2 to the combustor 2. The combustor 2 burns the high-pressure air A2 supplied from the compressor 1 and a fuel supplied from a fuel system 200 (to be described later) together, and supplies produced high-temperature combustion gas G1 to the turbine 3. The turbine 3 is driven to rotate by an expansion action of the combustion gas G1 supplied from the combustor 2. The combustion gas G1 that has driven the turbine 3 is discharged as exhaust gas G2. The generator G is driven to rotate by the turbine 3 and generates electric power.

—Gas Turbine Combustor—

Figure 3:
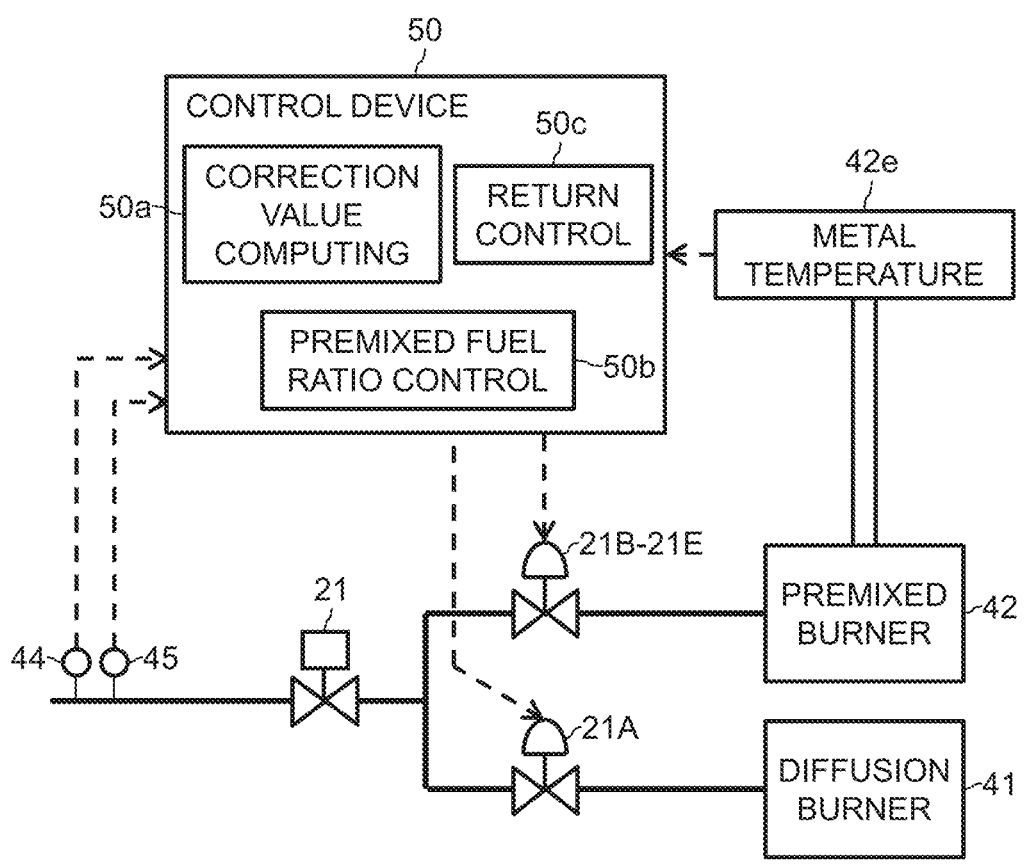
FIG. 3 is a schematic diagram of a control device provided in the gas turbine combustor of FIG. 1.

The combustor 2 includes a combustion liner 10, a burner 5, the fuel system 200, and a control device 50 (FIG. 3). The burner 5 includes a diffusion burner 41 and a premixed burner 42. The diffusion burner 41, the premixed burner 42, and a combustion chamber 11 are provided inside of a casing 4 of the gas turbine, while the fuel system 200 is provided outside of the casing 4.

The combustion liner 10 is a cylindrical member that forms the combustion chamber 11, and located downstream, in a fuel injection direction, of the diffusion burner 41 and the premixed burner 42 (right-hand side in FIG. 1). A space inside of the combustion liner 10 is the combustion chamber 11, a fuel and air supplied from the diffusion burner 41 and the premixed burner 42 are burnt to produce the combustion gas G1 in the combustion chamber 11.

An annular space formed between the combustion liner 10 and the casing 4 configures an annular flow passage 43 that guides the high-pressure air A2 from the compressor 1 to an upstream side of the burner 5. The high-pressure air A2 flowing into the annular flow passage 43 subjects the combustion liner 10 to convection cooling. In addition, part of the high-pressure air A2 flowing in the annular flow passage 43 flows into the combustion liner 10 from many cooling holes (not depicted) provided in an outer circumferential portion of the combustion liner 10, and is used for film cooling of the combustion liner 10. A remainder of the high-pressure air A2 that does not flow into the cooling holes arrives at the diffusion burner 41 or the premixed burner 42 by way of the annular flow passage 43. The high-pressure air A2 arriving at the diffusion burner 41 or the premixed burner 42 is supplied, together with the fuel supplied from the fuel system 200 to either a diffusion fuel nozzle 41a or premixed fuel nozzles 42a via fuel headers (not depicted), to the combustion chamber 11 and burnt therein.

—Burner—

The diffusion burner 41 is a burner by a diffusion combustion scheme and includes the diffusion fuel nozzle 41a and a swirl vane 41b. The diffusion fuel nozzle 41a is disposed on a central axis of the combustor 2, a fuel injection hole is provided in a tip end (right end in FIG. 1) of the diffusion fuel nozzle 41a, and the diffusion fuel nozzle 41a directly injects a fuel to the combustion chamber (rightward in FIG. 1) from the fuel injection hole. The swirl vane 41b is provided to surround an outer circumference of the diffusion fuel nozzle 41a near the tip end and injects a swirl air flow, thereby enhancing combustion stability of the diffusion burner 41.

The premixed burner 42 is a burner by a premixed combustion scheme and includes a burner liner 42b, a burner casing 42c, a plurality of vanes (premixer vanes) 42d, a plurality of premixed fuel nozzles 42a, and at least one thermometer 42e. The burner liner 42b and the burner casing 42c are cylindrical members that form a premixer, the burner liner 42b is provided to surround an outer periphery of the diffusion burner 41, and the burner casing 42c is provided to further surround an outer circumference of the burner liner 42b. A cylindrical space formed between the burner liner 42b and the burner casing 42c has an upstream side (left-hand side in FIG. 1) opened outside in a radial direction (toward the annular flow passage 43) and a downstream side opened in a central axis direction of the combustor 2 (toward the combustion chamber 11). The plurality of (12 in the present embodiment) vanes 42d separate the cylindrical space into a plurality of (12 in the present embodiment) premixers 42f. Each of the premixers 42f is a space where the fuel and the air are mixed together and a flame is not produced within the premixer 42f in a normal state. A ring-shaped flame stabilizer 73 is provided in outlet portions of the premixers 42f (combustion chamber 11-side with respect to the premixed burner 42). The flame stabilizer 73 is a flame stabilizer by a physical flame stabilization scheme provided in a flow passage of premixed unburnt gas as an obstacle for forming a circulating flow downstream (in the combustion chamber 11). The vanes 42d are disposed radially in a view from the combustion chamber 11 and each formed with a planer member in parallel to the central axis of the combustion chamber 11 in the present embodiment. The vanes 42d are formed thin (for example, formed to have a thickness of approximately several millimeters) for enhancing heat transfer efficiency. In addition, the vanes 42d extend widely from neighborhoods of an upstream end of the cylindrical space formed by the burner liner 42b and the burner casing 42 to neighborhoods of a downstream end thereof. Two premixed fuel nozzles 42a are provided to correspond to each premixer 42f and each connected to a premixed fuel system (to be described later). Similarly to the diffusion fuel nozzle 41a, a fuel jet hole is provided in a tip end (right end in FIG. 1) of each premixed fuel nozzle 42a, and the premixed fuel nozzle 42a injects a premixed fuel to the corresponding premixer 42f from the fuel jet hole. The fuel injected from each premixed fuel nozzle 42a is mixed with the high-pressure air A2 to produce air-fuel mixed gas in the premixer 42f and the air-fuel mixed gas is injected to the combustion chamber 11 (rightward in FIG. 1).

In the present embodiment, the premixed burner 42 is partitioned into a plurality of (four in the present embodiment) partial burners 42A to 42D. The partial burners 42A to 42D are arranged side by side in a circumferential direction to surround the diffusion burner 41 (in an order of the partial burners 42A, 42C, 42D, and 42B clockwise in a view from the combustion chamber 11 in the present embodiment). The partial burners 42A to 42D each include at least one set (three sets in the present embodiment) of the premixer 42f and the premixed fuel nozzles 42a. In other words, the premixed burner 42 is configured to be partitioned into the four partial burners 42A to 42D by the vanes 42d and a premixer in each of the partial burners 42A to 42D is further partitioned into the three premixers 42f by the respective vanes 42d.

As depicted in FIG. 1, the fuel system 200 includes a common fuel system 20 connected to a fuel supply source (not depicted), and first to fifth fuel systems 20A to 20E branched off from this common fuel system 20. A fuel shut-off valve (on-off valve) 21 is provided in the common fuel system 20, while first to fifth gas control valves 21A to 21E are provided in the first to fifth fuel systems 20A to 20E, respectively. The number of fuel systems provided branched off from the common fuel system 20 is not limited to five. The first fuel system 20A is a diffusion fuel system connected to the diffusion burner 41 (diffusion fuel nozzle 41a). The second to fifth fuel systems 20B to 20E are premixed fuel systems connected to the premixed fuel nozzles 42a. Specifically, the second fuel system 20B is connected to six premixed fuel nozzles 42a of the partial burner 42A via corresponding fuel headers (not depicted) and the third fuel header 20C is connected to six premixed fuel nozzles 42a of the partial burner 42B via corresponding fuel headers (not depicted). In addition, the fourth fuel system 20D is connected to six premixed fuel nozzles 42a of the partial burner 42C via corresponding fuel headers (not depicted) and the fifth fuel header 20E is connected to six premixed fuel nozzles 42a of the partial burner 42D via corresponding fuel headers (not depicted).

A flow rate of a diffusion fuel supplied from the first fuel system 20A to the diffusion burner 41 (hereinafter, referred to as "F1 fuel") is adjusted by the first gas control valve 21A. A flow rate of a fuel supplied from the second fuel system 20B to the partial burner 42A (hereinafter, referred to as "F21 fuel") is adjusted by the second gas control valve 21B. A flow rate of a fuel supplied from the third fuel system 20C to the partial burner 42B (hereinafter, referred to as "F22 fuel") is adjusted by the third gas control valve 21C. A flow rate of a fuel supplied from the third fourth system 20D to the partial burner 42C (hereinafter, referred to as "F23 fuel") is adjusted by the fourth gas control valve 21D. A flow rate of a fuel supplied from the fifth fuel system 20E to the partial burner 42D (hereinafter, referred to as "F24 fuel") is adjusted by the fifth gas control valve 21E. Individually adjusting the flow rate of the F1 fuel by the first gas control valve 21A and the flow rates of the F21 to F24 fuels by the second to fifth gas control valves 21B to 21E enables control over a power generation amount of the gas turbine plant 100.

—Sensors—

The thermometer 42e (not depicted in FIG. 2) is provided on one vane 42 of the premixed burner 42. A thermocouple, for example, can be employed as the thermometer 42e and a temperature measuring section is buried within the vane 42d. An interconnection line of the thermometer 42e protrudes to an outer circumferential portion of the burner casing 42c by way of, for example, an interior of the vane 42d without being exposed to the premixer 42f, and is extracted to outside of the casing 4 by way of an interior of a strut (not depicted) supporting the burner casing 42c for the casing 4. The interconnection line of the thermometer 42e is connected to the control device 50. In the present embodiment, the thermometers 42e are alternately installed in the 12 vanes 42d (that is, one thermometer 42e is provided in each of the six vanes 42d). The temperature measuring section of each thermometer 42e is located in an intermediate portion between a combustion chamber 11-side end portion of one vane 42d and fuel jet holes of the premixed fuel nozzles 42 in the fuel injection direction of the premixed fuel nozzles 42a.

Furthermore, the common fuel system 20 can be provided with a calorimeter 44 and a concentration meter (for example, gas chromatograph) 45. The calorimeter 44 is a sensor that measure a calorific value of the premixed fuel and is connected to the control device 50. The calorimeter 44 may be configured to be provided in at least one of the premixed fuel systems 20B to 20E instead of being provided in the common fuel system 20. The concentration meter 45 is a sensor that measures a hydrogen concentration or the like of the premixed fuel and is connected to the control device 50. The concentration meter 45 may be configured to be provided in at least one of the premixed fuel systems 20B to 20E instead of being provided in the common fuel system 20. In another alternative, the calorimeter 44 and the concentration meter 45 may be provided in a fuel supply facility (not depicted) that is a supply source of the fuel supplied to the common fuel system 20. While the calorimeter 44 and the concentration meter 45 are not essential elements in the present embodiment, the calorimeter 44 is essential in a fifth embodiment (FIGS. 14A and 14B) and the concentration meter 45 is essential in a sixth embodiment (FIGS. 15A and 15B).

—Control Device—

FIG. 3 is a schematic diagram of the control device. The control device 50 depicted in FIG. 3 is a control computer and has functions to control the first gas control valve (hereinafter, also referred to as "diffusion gas control valve") 21A and the second to fifth gas control valves (hereinafter, also referred to as "premixed gas control valves") 21B to 21E. The control device 50 in the present embodiment has a function to execute premixed fuel ratio control. The premixed fuel ratio control is control executed to increase openings of the premixed gas control valves 21B to 21E and to increase an opening of the diffusion gas control valve 21A in a case in which a detection value (detected temperature Tm) of the thermometer 42e exceeds a set value Ts. This premixed fuel ratio control is exercised in such a manner that a sum of flow rates of the fuels supplied to the diffusion burner 41 and the premixed burner 42 remains the same as that just before execution of the premixed fuel ratio control. A premixed fuel ratio control circuit 50b included in the control device 50 is a functional section that executes the premixed fuel ratio control.

In the present embodiment, the flow rates of the fuels supplied to the premixed burners 42 are each reduced to a preset constant value to be associated with the premixed fuel ratio control. This constant value is a value set in such a manner that a fuel-air ratio of the premixed fuel determined by the sum of the premixed fuels injected from the premixed fuel nozzles 42a and a flow rate (set value) of the high-pressure air A2 falls below a stable combustion limit. The stable combustion limit is a maximum value of the fuel-air ratio at which a flame can be held and which is calculated on the basis of a flammability limit. At the premixer fuel-air ratio that falls below the stable combustion limit, the flame produced by the premixed fuel is extinguished. The control device 50 computes a correction value (decrement) of the opening of each of the premixed fuel gas control valves 21A to 21E for reducing the flow rate of the supplied premixed fuel from a current value to the constant value at a time of executing the premixed fuel ratio control, and outputs the computed correction value (decrement) to each of the premixed fuel gas control valves 21B to 21E. At the same time, the control device 50 computes a correction value (increment) of the opening of the diffusion gas control valve 21A for compensating for the decrement of the flow rate of the supplied premixed fuel, and outputs the computed correction value (increment) to the diffusion gas control valve 21A. A correction value computing circuit 50a included in the control device 50 is a functional section that computes the correction values of the openings of the premixed gas control valves 21B to 21E and the diffusion gas control valve 21A.

In addition, the control device 50 has a function to execute return control. The return control is executed after execution of the premixed fuel ratio control and is the control to return the openings of the premixed gas control valves 21B to 21E and the diffusion gas control valve 21A to the values before execution of premixed fuel ratio reduction control after passage of set time Δt2 since the detection value of the thermometer 42e falls below the set value Ts. A return control circuit 50c included in the control device 50 is a functional section that executes the return control.

—Operation—

Figure 4:
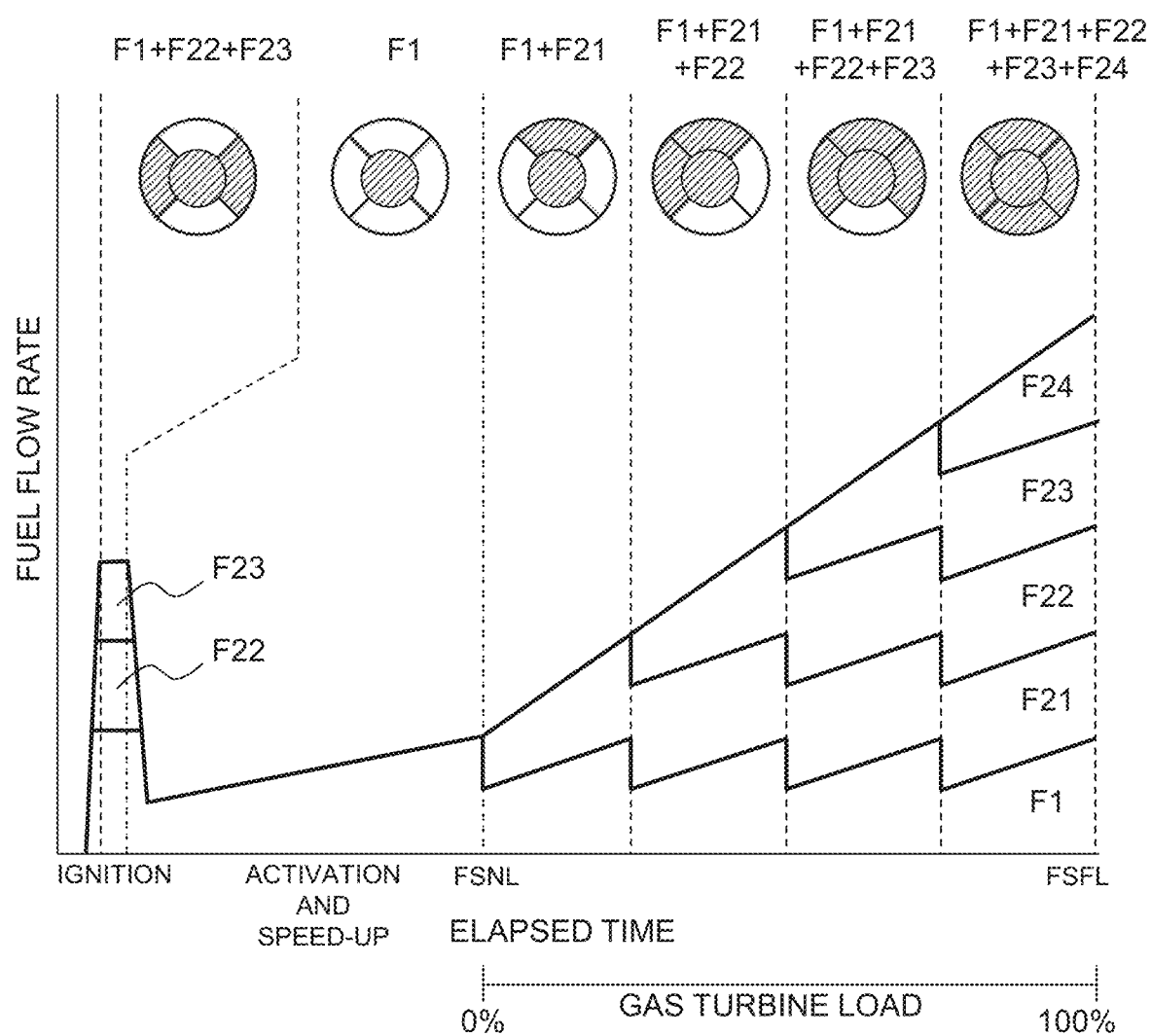
FIG. 4 is a characteristic diagram illustrating a fuel flow rate per system with respect to a gas turbine load in the gas turbine combustor of FIG. 1.

FIG. 4 is a characteristic diagram illustrating a fuel flow rate per system with respect to a gas turbine load. In FIG. 4, a horizontal axis indicates elapsed time and a vertical axis indicates a fuel flow rate. At a time of igniting the gas turbine, the F1 fuel, the F22 fuel, and F23 fuel are supplied from the first, third, and fourth fuel systems 20A, 20C, and 20D, and the fuels are injected from the diffusion burner 41 and the partial burners 42B and 42C. During this time, no fuel is supplied from the second and fifth fuel systems 20B and 20E, so that no fuel is injected from the partial burners 42A and 42D.

After ignition of the gas turbine, a state is changed over to a single combustion state in which only the F1 fuel is supplied (the fuel is injected only from the diffusion burner 41), and the turbine 3 is sped up by increasing the F1 fuel until the state reaches a rated speed no load state (FSNL: Full Speed No Load). Power generation is started when the turbine 3 is sped up to the rated speed, and the gas turbine load is increased until the state reaches a rated speed rated load state (FSFL: Full Speed Full Load). During this time, the fuels are additionally supplied in an order of the F21 fuel, the F22 fuel, the F23 fuel, and the F24 fuel so that a fuel-air ratio of the burner 5 falls in a stable combustion range in response to an increase in the gas turbine load, thus enlarging a fuel supply range stepwise. The control device 50 (or another control device) controls the fuel systems in accordance with such a schedule, and the gas turbine load reaches the rated speed rated load (FSFL) after the state transitions into a full combustion state in which the fuels are injected from all the diffusion burner 41 and the partial burners 42A to 42D.

Figure 5:
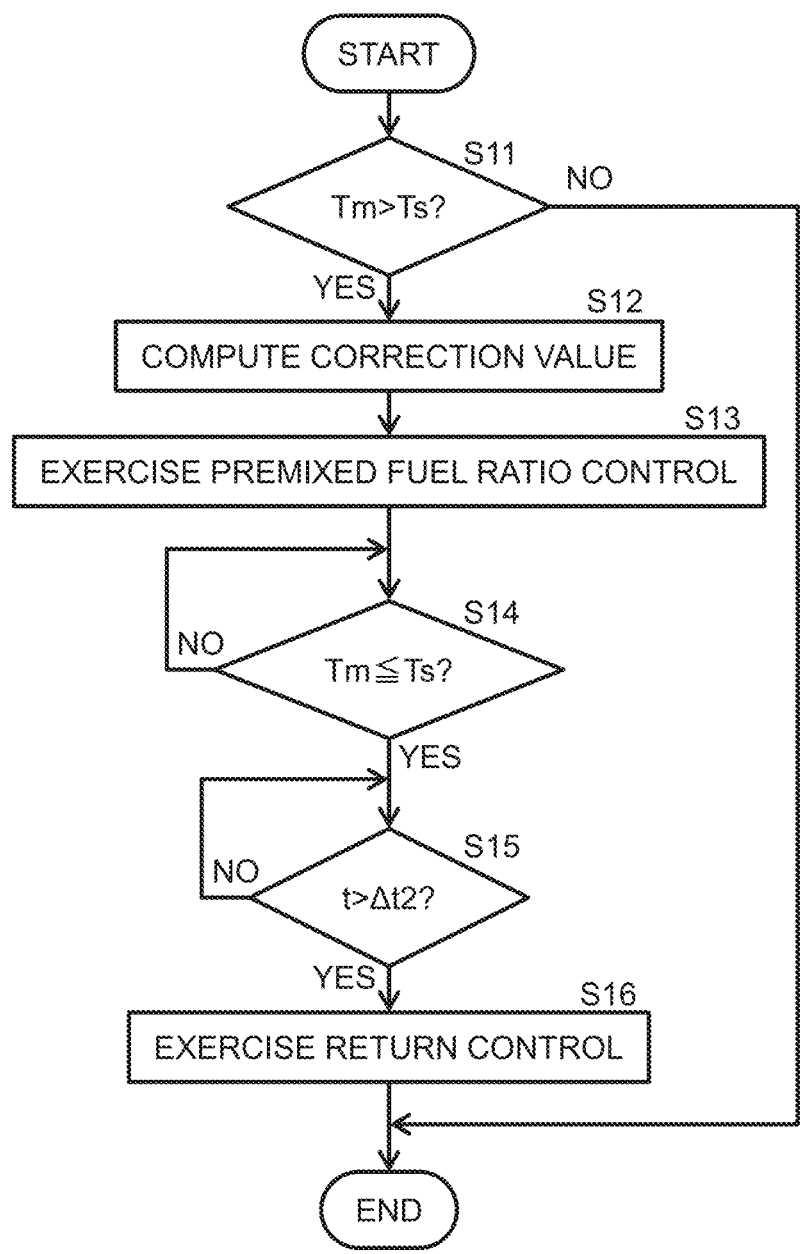
FIG. 5 is a flowchart illustrating an example of procedures for premixed fuel ratio control exercised by the control device of FIG. 3.

FIG. 5 is a flowchart illustrating an example of procedures of the premixed fuel ratio control exercised by the control device 50. The control device 50 repeatedly executes the procedures of FIG. 5 during gas turbine operation (including time before and after the gas turbine load reaches the FSFL). First, the premixed fuel ratio control circuit 50b of the control device 50 determines whether the detected temperature Tm of the thermometer 42 (for example, any one of the thermometers 42e) exceeds the set value Ts (Step S11). Since the temperature measuring section of the thermometer 42e is buried within one of the vanes 42d in a thickness direction, the detected temperature Tm of the thermometer 42e is close to a mixture temperature of a temperature of the high-pressure air A2 and that of the premixed fuel supplied to the premixers 42f (Tm≤Ts) in a normal operation state. In a case in which the detected temperature Tm (for example, detected temperature Tm of all the thermometers 42e) is equal to or lower than the set value Ts as described above, the control device 50 ends the procedures of FIG. 5. Meanwhile, the vanes 42d are high heat conductivity thin plates. Owing to this, in a case in which a flame is produced within one of the premixers 42f due to, for example, a back flow of the flame from the combustion chamber 11 (flashback) or a flow of a flying object (ignition source) accompanying the high-pressure air A2 or the fuel into one of the premixers 42f, the detected temperature Tm by the thermometer 42e rises by heat transfer from the flame (Tm>Ts). In a case in which the flame is produced within one of the premixers 42f and the detected temperature Tm (for example, the detected temperature Tm of any one of the thermometers 42e) exceeds the set value Ts as described above, the control device 50 moves the procedures from Step S11 to Step S12.

In the case of Tm>Ts, the correction value computing circuit 50a of the control device 50 computes correction values of openings of the first to fifth gas control valves 21A to 21E (Step S12), and the premixed fuel ratio control circuit 50b controls the openings of the first to fifth gas control valves 21A to 21E (Step S13). The openings of the second to fifth gas control valves 21B to 21E are thereby reduced, the premixed fuel ratio falls below the stable combustion limit, and the flame produced within the premixers 42f is extinguished. During this time, increasing the opening of the first gas control valve 21A in response to the decrement of the premixed fuel to increase the flow rate of the diffusion fuel enables a sum of flow rates of the fuels supplied to the burner 5 to be maintained to a value just before execution of the premixed fuel ratio control.

After executing the procedures of Steps S12 and S13, the return control circuit 50c of the control device 50 determines whether the detected temperature Tm of the thermometer 42e (for example, all of the thermometers 42e) falls to be equal to or lower than the set value Ts (Step S14). During Tm>Ts, the control device 50 repeats the procedure of Step S14 and the opening of each of the first to fifth gas control valves 21A to 21E is maintained under the premixed fuel ratio control. After Tm≤Ts by extinguishment, the return control circuit 50c of the control device 50 determines whether elapsed time t from time of Tm≤Ts exceeds set time Δt2 (Step S15). The control device 50 repeats the procedure of Step S15 until the set time Δt2 elapses, the return control circuit 50c executes the return control described previously after passage of the set time Δt2 (Step S15), and the control device 50 ends the procedures of FIG. 5.

—Comparison—

Figure 6:
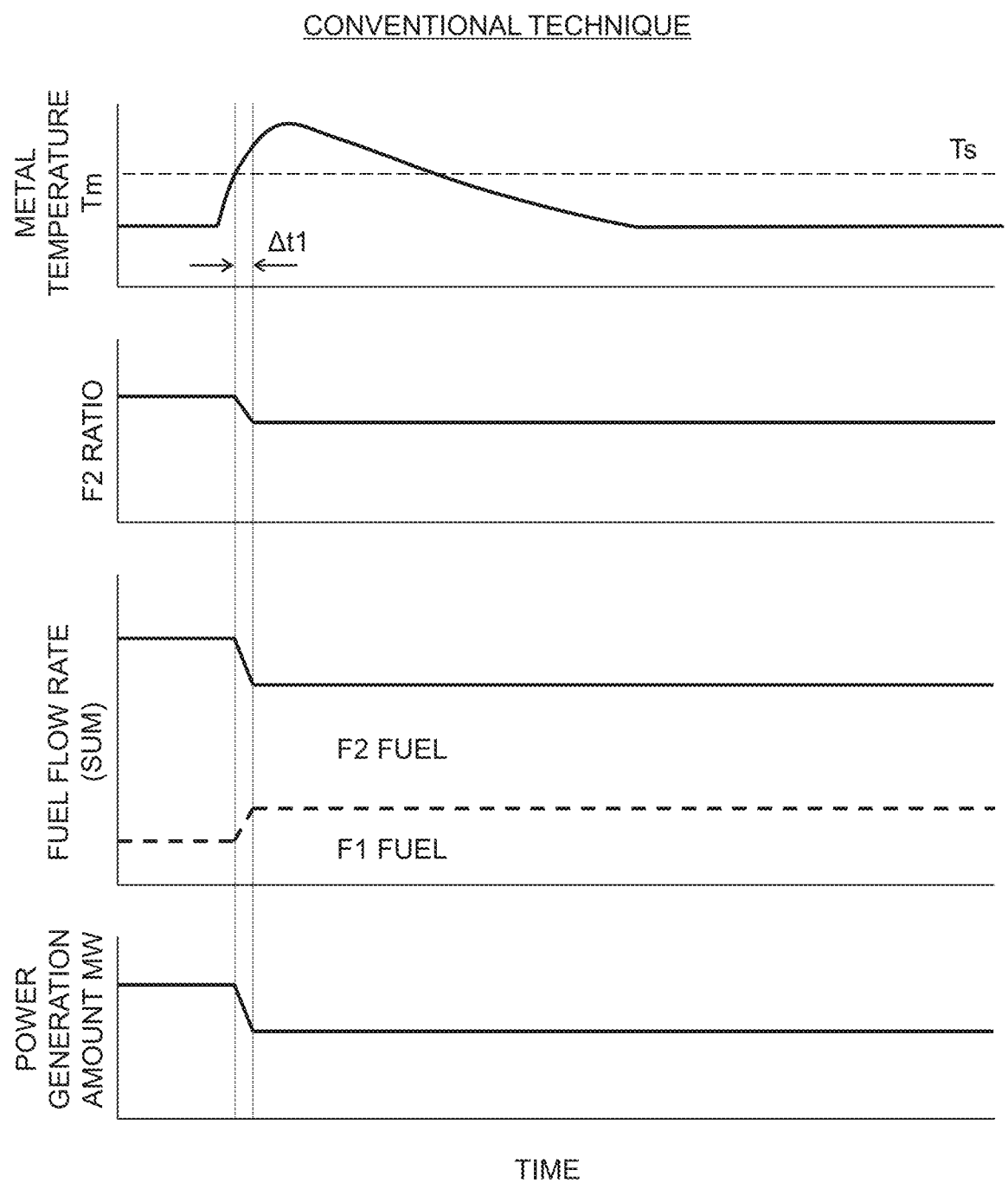
FIG. 6 is a characteristic diagram illustrating a burner metal temperature, a premixed fuel ratio, a fuel flow rate, and a power generation amount according to a comparison.

FIG. 6 is a characteristic diagram illustrating a burner metal temperature, a premixed fuel ratio, a fuel flow rate, and a power generation amount according to a comparison. In the comparison depicted in FIG. 6, similarly to the present embodiment, in the case in which the flame is produced within one of the premixers 42A to 42D and the detected temperature Tm exceeds the set value Ts, the flow rate of the premixed fuel (denoted as "F2 fuel" in FIG. 6) is reduced and the flow rate of the diffusion fuel (depicted as "F1 fuel" in FIG. 6) is increased within certain time Δt1. The premixed fuel ratio (denoted by "F2 ratio" in FIG. 6) is thereby reduced, the flame within one of the premixers 42A to 42D is extinguished, and the detected temperature Tm can be reduced.

It is noted, however, that the increment of the flow rate of the diffusion fuel is lower than the decrement of the premixed fuel, the sum of the flow rates of the fuels supplied to the burners 41 and 42 falls to be associated with an extinguishment operation, and the power generation amount falls by as much as this fall.

—Effects—

Figure 7:
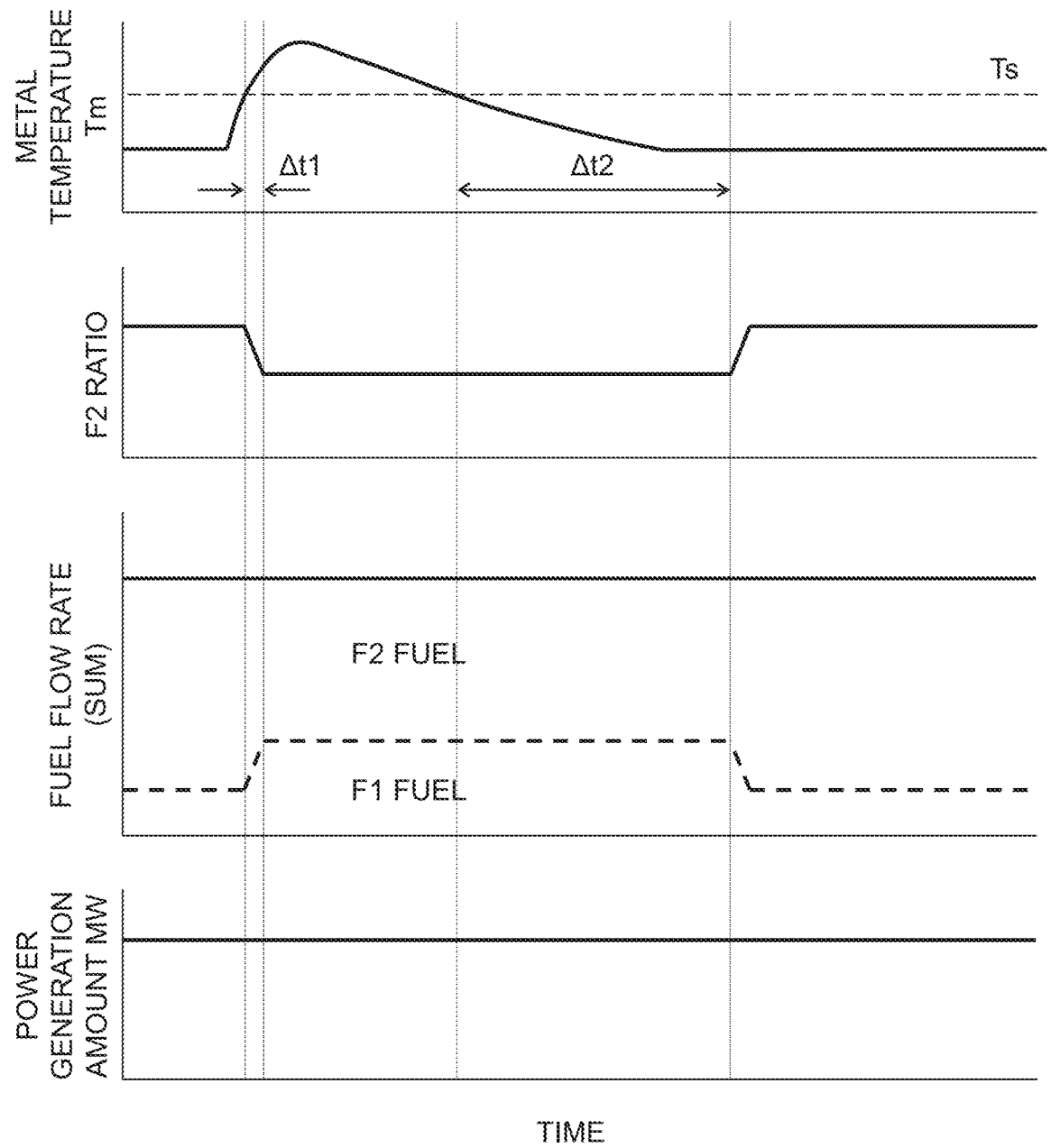
FIG. 7 is a characteristic diagram illustrating a burner metal temperature, a premixed fuel ratio, a fuel flow rate, and a power generation amount according to the first embodiment.
Figure 8:
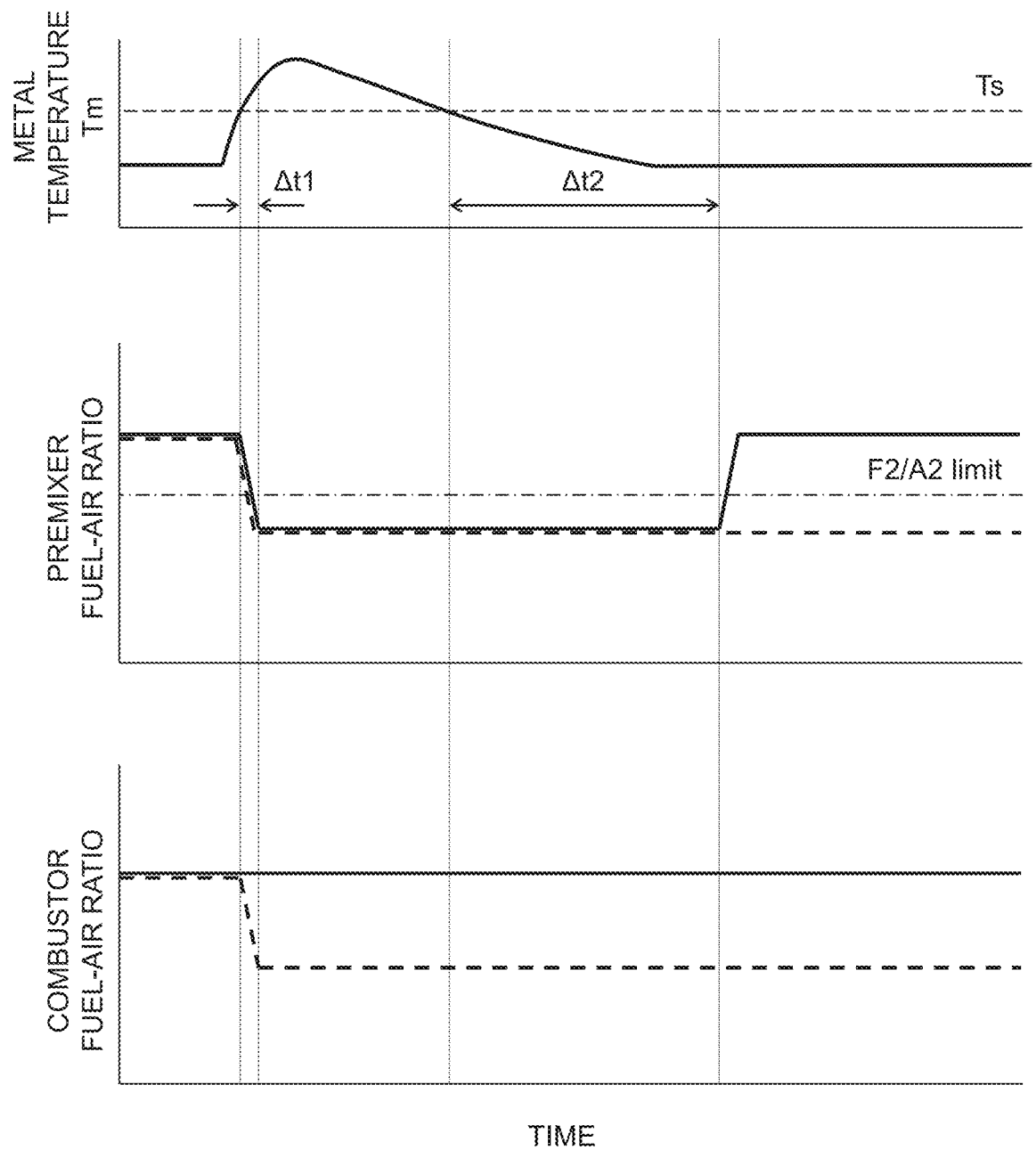
FIG. 8 is a characteristic diagram illustrating the burner metal temperature, a premixer fuel-air ratio, and a combustor fuel-air ratio.

(1) In the present embodiment, differently from the comparison, the flow rate of the diffusion fuel is increased by as much as the decrement of the flow rate of the premixed fuel so that the sum of the fuel flow rates of the diffusion fuel and the premixed fuel does not change at a time of reducing the premixed fuel ratio (FIG. 7). It is thereby possible to maintain the fuel-air ratio of the entire combustor 2 (FIG. 8), while the fuel-air ratio of the premixer falls below the stable combustion limit (F2/A2 limit) due to the reduction of the premixed fuel ratio (FIG. 8). Therefore, it is possible to maintain a reduction in output power associated with an extinguishment operation (FIG. 7) while promptly extinguishing the flame produced in one of the premixers 42f, and to improve reliability and operability of the combustor 2. A premixer fuel-air ratio and a combustor fuel-air ratio indicated by broken lines in FIG. 8 correspond to the comparison of FIG. 6 that is illustrated for comparison with the present embodiment.

At this time, in the present embodiment, the plurality of vanes 42d that partition the premixed burner 42 into the plurality of premixers 42f are made thin to enhance heat transfer characteristics and the thermometers 42e are buried within the thin vanes 42, thereby making it possible to promptly detect that the flame has been produced within one of the premixers 42f. It is thereby possible to sufficiently enhance responsiveness and flame detection certainty in automating the extinguishment operation described above (premixed fuel ratio control), and to put premixed fuel ratio automatic control to practical use. In a validation process, this control enabled nitrogen oxides (NOx) emissions to return to an original value in approximately a few tens of seconds since the nitrogen oxides (NOx) emissions started to increase. Since the flame produced within the premixer can be extinguished promptly and automatically and the reduction in the output power of the gas turbine associated with the extinguishment can be suppressed, it is possible to improve operation efficiency of the premixed burner 42.

(2) There is a probability that a flame is produced in a presence range of the premixed unburnt gas in one of the premixers 42f, that is, a downstream region of the premixed fuel nozzles in one of the premixers 42f. It is noted that examples of a factor for producing the flame in one of the premixers 42f include the back flow of the flame from the combustion chamber 11 and the flow of a flying object accompanying the high-pressure air A2 or the fuel into one of the premixers 42f as described above. In a case in which the flame is produced within one of the premixers 42f due to the flashback, an increase in temperatures of the vanes 42d starts with the vanes 42d closer to the combustion chamber 11. In a case in which the flame is produced within one of the premixers 42f due to the flying object, the increase in the temperatures of the vanes 2d often starts with the vanes 42d closer to the premixed fuel nozzles 42a. Therefore, disposing the temperature measuring section of each thermometer 42e in the intermediate portion between the combustion chamber 11-side end portion of each vane 42d and the fuel jet holes of the premixed fuel nozzles 42a as described in the present embodiment makes it possible to detect the flame due to the flashback and that due to the flying object without delay.

It is noted, however, that an installation position of each thermometer 42e is not necessarily the intermediate portion between the combustion chamber 11-side end portion of the one vane 42d and the fuel jet holes of the premixed fuel nozzles 42a in burying the thermometer 42e in the vane 42d as long as the basic effect (1) described above is obtained. For example, in a case of preferentially detecting the flashback, the position of disposing the temperature measuring section of the thermometer 42e may be moved to a position near a combustion chamber 11-side end portion of the vane 42d.

(3) In the present embodiment, with the passage of the set time Δt2 since the detected temperature Tm falls below the set value Ts after execution of the premixed fuel ratio control, the premixed fuel ratio automatically returns. As described above, an ingenious idea of installing each thermometer 42e can ensure higher detection sensitivity; thus, it is possible to not only detect that the flame is produced within one of the premixers 42d but also detect extinguishment with high sensitivity and the premixed fuel ratio can, therefore, automatically return. This can be also a great contribution to improving the operation efficiency. In addition, the flying object accompanying, for example, the high-pressure air A2 or the fuel often flows into one of the premixers 42f intermittently at certain timing. Owing to this, the flame due to the flying object is often produced again soon after extinguishment. The same thing could occur to the flashback depending on a combustion condition. If a return operation is executed right after the extinguishment in such a case, the premixed fuel ratio control and the return control are often repeatedly executed in a short period of time. In the present embodiment, by contrast, executing the return control in wait for passage of the certain time after the extinguishment and dying down of a combustion state makes it possible to suppress a frequent fluctuation in the combustion state (for example, an increase or a decrease in the nitrogen oxides (NOx) emissions).

Second Embodiment

Figure 9A:
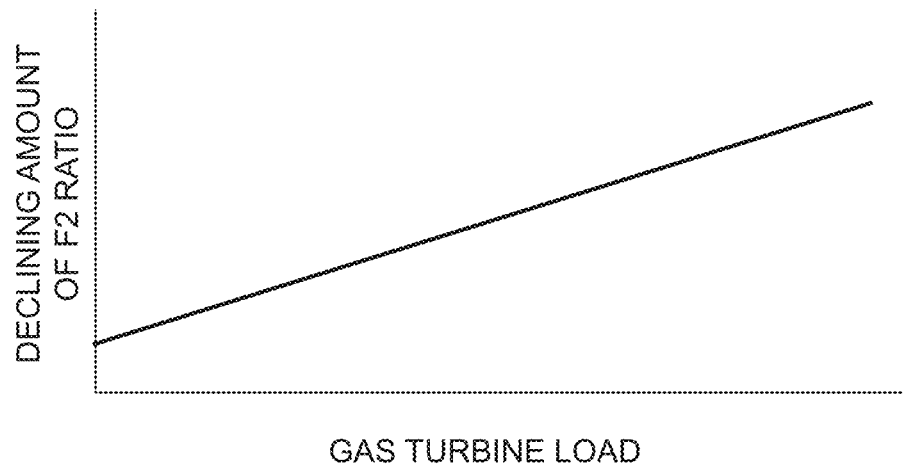
FIG. 9A is a characteristic diagram representing a relationship between a declining amount (correction amount) of a premixer fuel-air ratio and a gas turbine load under premixed fuel ratio control in a gas turbine combustor according to a second embodiment of the present invention.
Figure 9B:
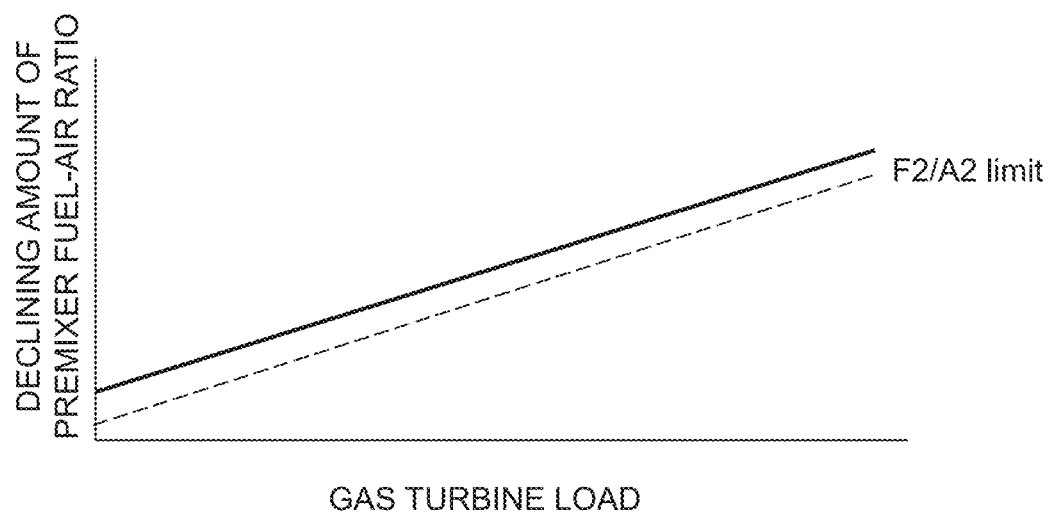
FIG. 9B is a characteristic diagram representing a relationship between the declining amount of the premixer fuel-air ratio and the gas turbine load under the premixed fuel ratio control in the gas turbine combustor according to the second embodiment of the present invention.

FIG. 9A is a characteristic diagram representing a relationship between a declining amount (correction amount) of a premixed fuel ratio and a gas turbine load and FIG. 9B is a characteristic diagram representing a relationship between a declining amount of a premixer fuel-air ratio and the gas turbine load under premixed fuel ratio control in a gas turbine combustor according to a second embodiment of the present invention.

The present embodiment is characterized in that the control device 50 is configured to increase controlled variables of the first to fifth gas control valves 21A to 21E under the premixed fuel ratio control to be associated with an increase in the gas turbine load. The flow rate of the premixed fuel is in a higher state as the gas turbine load is higher. Owing to this, for reducing the premixer fuel-air ratio to fall below the stable combustion limit (FIG. 9B), it is necessary to make lower the flow rate of the premixed fuel as the gas turbine load is higher. In the present embodiment, data that specifies a correction amount of the premixed fuel ratio in response to the gas turbine load as depicted in FIG. 9A is stored in the correction value computing circuit 50a, and the correction value computing circuit 50a computes the correction amount in response to the gas turbine load on the basis of the data. While a case of linearly increasing the correction amount in response to the gas turbine load is exemplarily illustrated in the present embodiment, it is not always necessary to linearly set a line of the relationship between the gas turbine load and the correction amount. The present embodiment is similar to the first embodiment in the other respects.

The present embodiment can obtain similar effects to those of the first embodiment. In addition, specifying the correction amount as described above makes it possible to uniquely determine an appropriate correction amount in response to the gas turbine load and to alleviate a computing load of the control device 50 associated with the control. Furthermore, it is conceivable that the flow rate of the premixed fuel is reduced to a minimum value irrespectively of the gas turbine load; in this case, the correction amount possibly becomes higher as the gas turbine load is higher and the combustion state possibly changes excessively. To address such a possibility, according to the present embodiment, the flow rate of the premixed fuel is reduced to such an extent that the premixer fuel-air ratio falls below the stable combustion limit at a certain rate; thus, it is possible to suppress the excessive change in the combustion state (for example, an increase in the nitrogen oxides (NOx) emissions).

Third Embodiment

Figure 10:
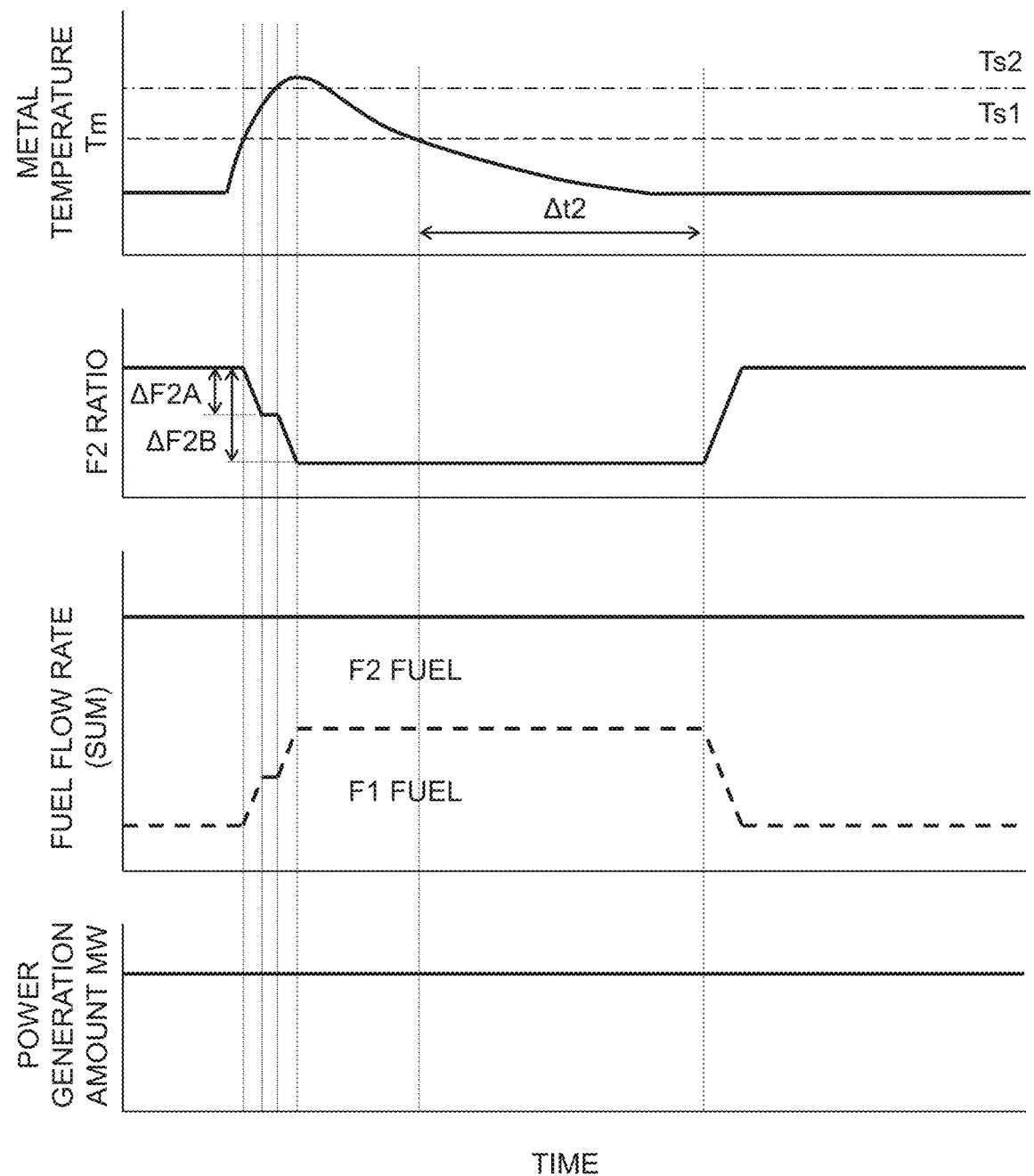
FIG. 10 is a characteristic diagram illustrating a burner metal temperature, a premixed fuel ratio, a fuel flow rate, and a power generation amount according to a third embodiment of the present invention.
Figure 11A:
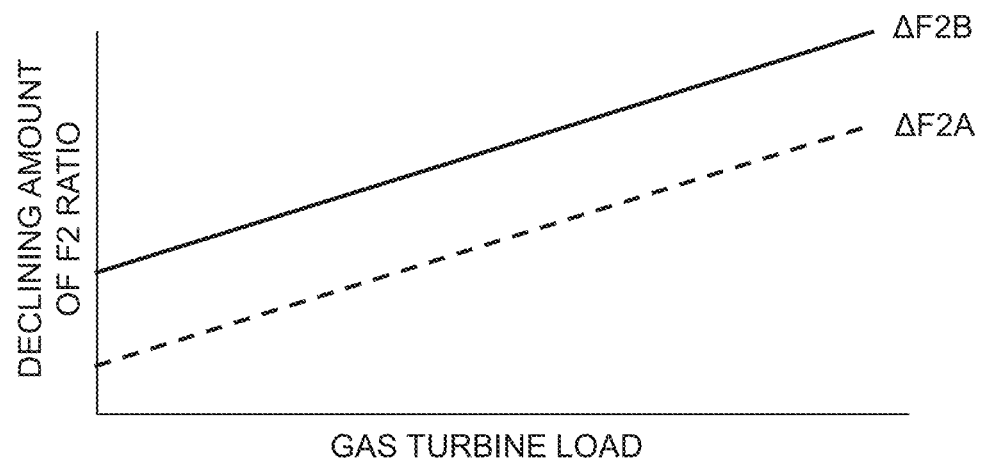
FIG. 11A is a characteristic diagram representing a relationship between a declining amount (correction amount) of a premixed fuel ratio and a gas turbine load under premixed fuel ratio control in a gas turbine combustor according to the third embodiment of the present invention.
Figure 11B:
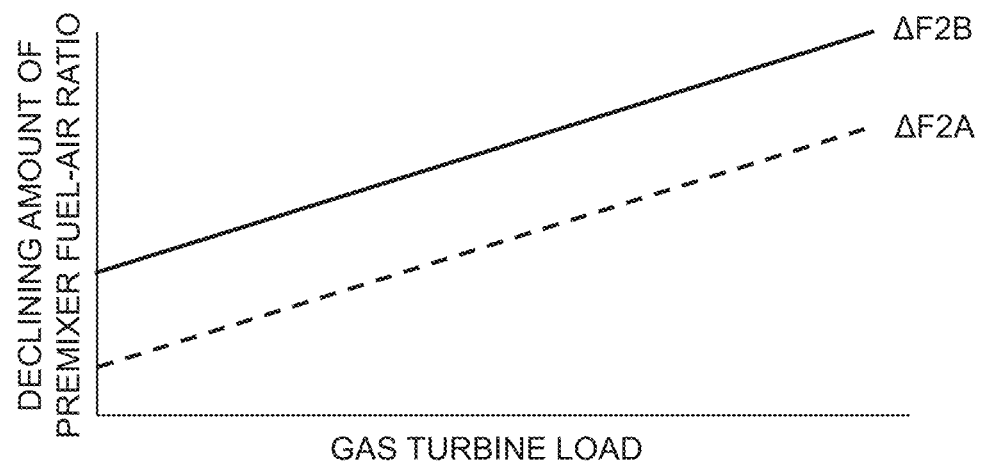
FIG. 11B is a characteristic diagram representing relationship between a declining amount of a premixer fuel-air ratio and the gas turbine load under the premixed fuel ratio control in the gas turbine combustor according to the third embodiment of the present invention.

FIG. 10 is a characteristic diagram illustrating a burner metal temperature, a premixed fuel ratio, a fuel flow rate, and a power generation amount according to a third embodiment of the present invention, and corresponds to FIG. 7 according to the first invention. FIG. 11A is a characteristic diagram representing a relationship between a declining amount (correction amount) of a premixed fuel ratio and a gas turbine load and FIG. 11B is a characteristic diagram representing a relationship between a declining amount of a premixer fuel-air ratio and the gas turbine load under premixed fuel ratio control according to the present embodiment. FIGS. 11A and 11B correspond to FIGS. 9A and 9B according to the second embodiment.

In the present embodiment, a plurality of (two in the present embodiment) set values Ts1 and Ts2 (Ts1<Ts2) are set for the detected temperature Tm as depicted in FIG. 10. In addition, different controlled variables of the first to fifth gas control valves 21A to 21E are set to correspond to the set values Ts1 and Ts2. As depicted in FIG. 10, the correction value computing circuit 50a of the control device 50 computes a correction value in response to the detected temperature Tm and the premixed fuel ratio control circuit 50b executes the premixed fuel ratio control stepwise. While an example of executing two stages of the premixed fuel ratio control is be described in the present embodiment, it is possible to execute three or more stages.

Data associated with correction amounts ΔF2A and ΔF2B of the premixed fuel ratio in response to the gas turbine load as depicted in FIG. 11A is stored in the correction value computing circuit 50a. ΔF2A is the correction amount in a case of Ts1<Tm≤Ts2, and ΔF2B is the correction amount in a case of Tm>Ts2. While the correction amounts ΔF2A and ΔF2B are set to be linearly increased in response to the gas turbine load similarly to the second embodiment, it is not always necessary to linearly set the line of the relationship between the gas turbine load and the correction amount. The present embodiment is similar to the first embodiment in the other respects.

Figure 12:
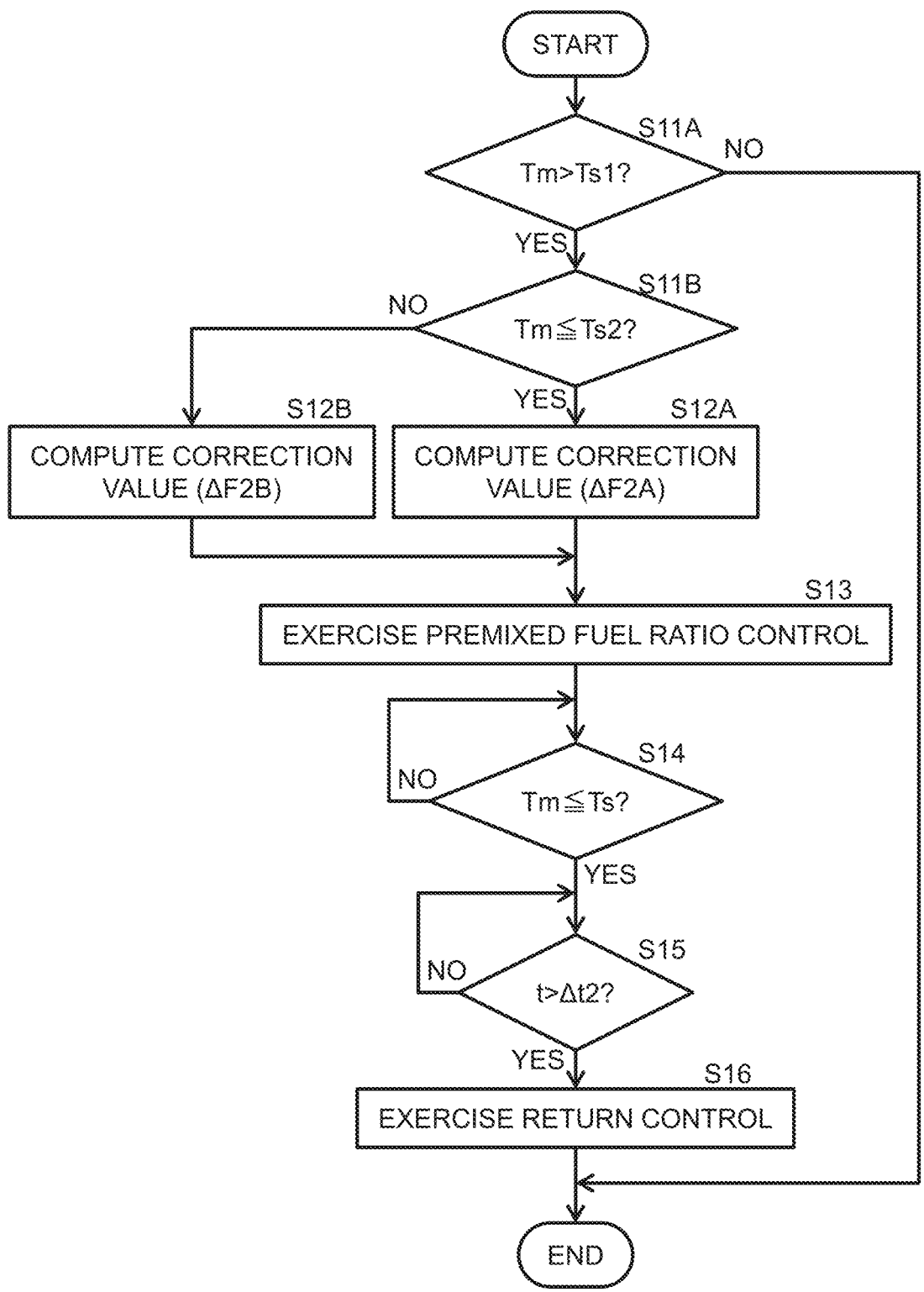
FIG. 12 is a flowchart illustrating an example of procedures for premixed fuel ratio control exercised by a control device provided in the gas turbine combustor according to the third embodiment of the present invention.

FIG. 12 is a flowchart illustrating an example of procedures for premixed fuel ratio control exercised by a control device provided in the gas turbine combustor according to the present embodiment. The procedures of FIG. 12 differ from those of FIG. 5 according to the first embodiment in that the procedure of Step S11 is replaced by procedures of Steps S11A and S11B and the procedure of Step S12 is replaced by those of Steps S12A and S12B.

In other words, the premixed fuel ratio control circuit 50b of the control device 50 first determines whether the detected temperature Tm of the thermometer 42e (for example, any one of the thermometers 42e) exceeds the set value Ts1 (Step S11A). In a case in which the operation state is normal in this way and the detected temperature Tm (for example, the detected temperature Tm of all the thermometers 42e) is equal to or lower than the set value Ts1, the control device 50 ends the procedures of FIG. 12. In a case in which the detected temperature Tm (for example, the detected temperature Tm of any one of the thermometers 42e) exceeds the set value Ts1, the control device 50 determines whether the detected temperature Tm of the thermometer 42e (for example, any one of the thermometers 42e) is equal to or lower than the set value Ts2 (Step S11B). The control device 50 goes to the procedure of Step S12 in a case in which the detected temperature Tm is equal to or lower than the set value Ts2 (Ts1<Tm≤Ts2), and goes to the procedure of Step S12B in a case in which the detected temperature Tm is higher than the set value Ts2. In the case of Ts1<Tm≤Ts2, the correction value computing circuit 50a of the control device 50 computes the correction amounts of the openings of the first to fifth gas control valves 21A to 21E so that the declining amount of the premixed fuel ratio is equal to ΔF2A and goes to the procedure of Step S13 (Step S12A). In the case of Tm>Ts2, the correction value computing circuit 50a of the control device 50 computes the correction amounts of the openings of the first to fifth gas control valves 21A to 21E so that the declining amount of the premixed fuel ratio is equal to ΔF2B and goes to the procedure of Step S13 (S12B). Subsequent procedures of Steps S13 to S16 are identical to those in FIG. 5.

The present embodiment can obtain similar effects to those of the first embodiment. In addition, controlling the premixed fuel ratio stepwise makes it possible to suppress the change in the combustion state (for example, the increase in the nitrogen oxides (NOx) emissions). For example, the premixed fuel ratio is reduced by ΔF2A at timing, for example, at which the detected temperature Tm exceeds the set value Ts1. If the detected temperature Tm falls below the set value Ts1 without reaching the set value Ts2, it is possible to hold down the declining amount of the premixed fuel ratio to ΔF2A lower than ΔF2B.

Fourth Embodiment

Figure 13:
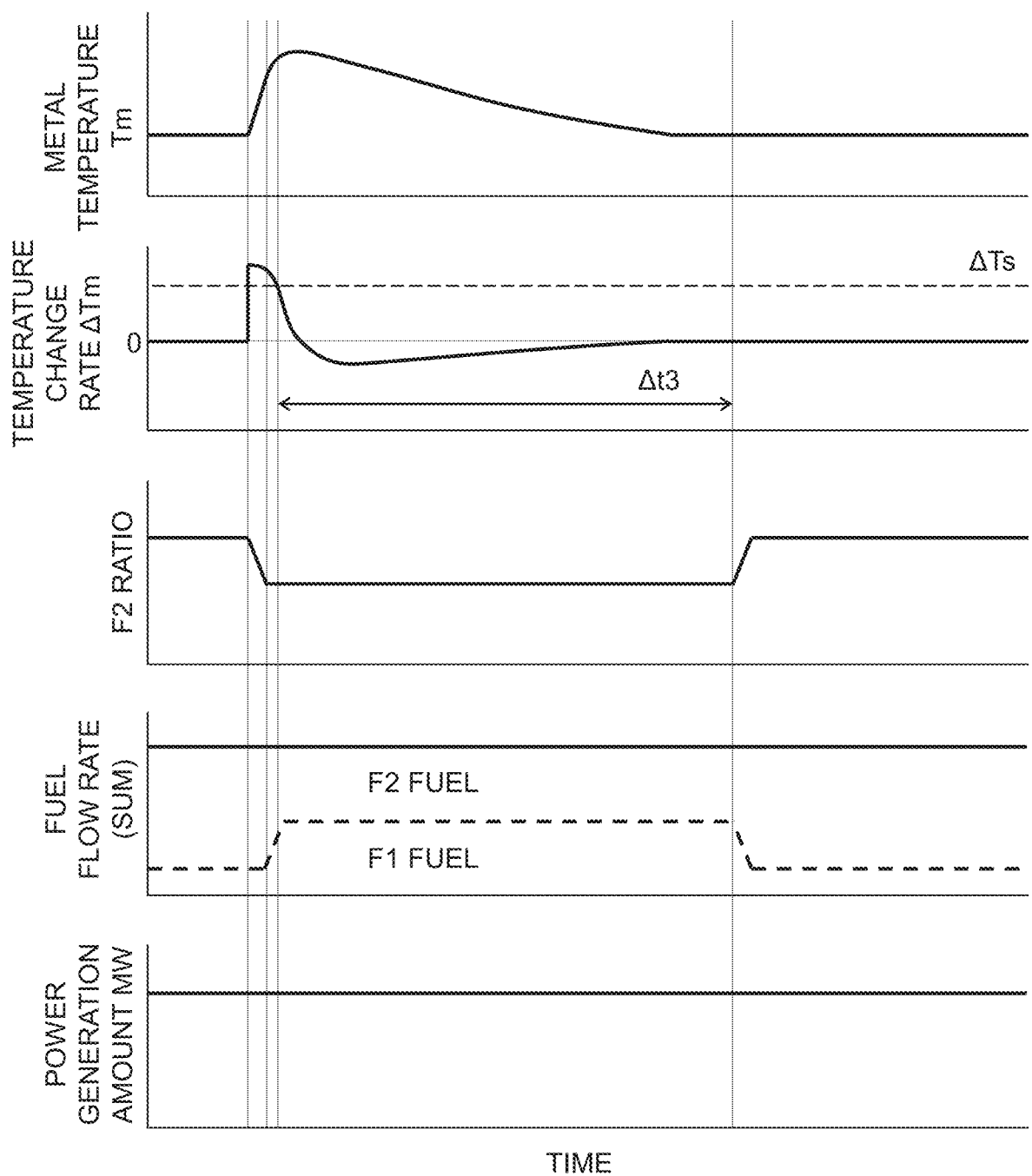
FIG. 13 is a characteristic diagram illustrating a burner metal temperature, a premixed fuel ratio, a fuel flow rate, and a power generation amount according to a fourth embodiment of the present invention.

FIG. 13 is a characteristic diagram illustrating a burner metal temperature, a premixed fuel ratio, a fuel flow rate, and a power generation amount according to a fourth embodiment of the present invention, and corresponds to FIG. 7 according to the first invention. The control device 50 according to the present embodiment is configured so that the premixed fuel ratio control circuit 50b executes the premixed fuel ratio control in a case in which a change rate ΔTm (increase rate) of the detected temperature Tm exceeds a corresponding set value ΔTs. An instance in which the change rate ΔTm of the detected temperature is the highest is a case in which a flame has been produced in one of the premixers 42f. In the present embodiment, it is detected that the flame has been produced in one of the premixers 42f upon determining that the change rate ΔTm exceeds the set value ΔTs, and the premixed fuel ratio control circuit 50b executes the premixed fuel ratio control. The premixed fuel ratio control is similar per se to that of the first embodiment.

Furthermore, after the flame is extinguished, the detected temperature Tm starts to gradually fall and the change rate ΔTm (falling rate) similarly starts to gradually fall. In the control device 50 according to the present embodiment, the return control circuit 50c executes the return control to return the premixed fuel ratio in wait for the passage of set time Δt3 since the change rate ΔTm during this time falls below the set value ΔTs.

The present embodiment is similar to the first embodiment in the other respects. The premixed fuel ratio control based on the change rate of the detected temperature as described above can be realized.

Fifth Embodiment

Figure 14A:
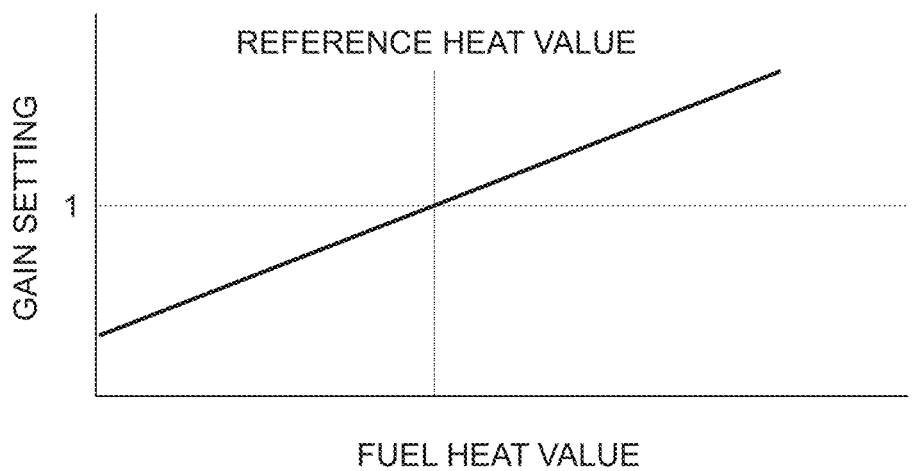
FIG. 14A is a characteristic diagram representing a relationship between a fuel heat value and gain setting under premixed fuel ratio control in a gas turbine combustor according to a fifth embodiment of the present invention.
Figure 14B:
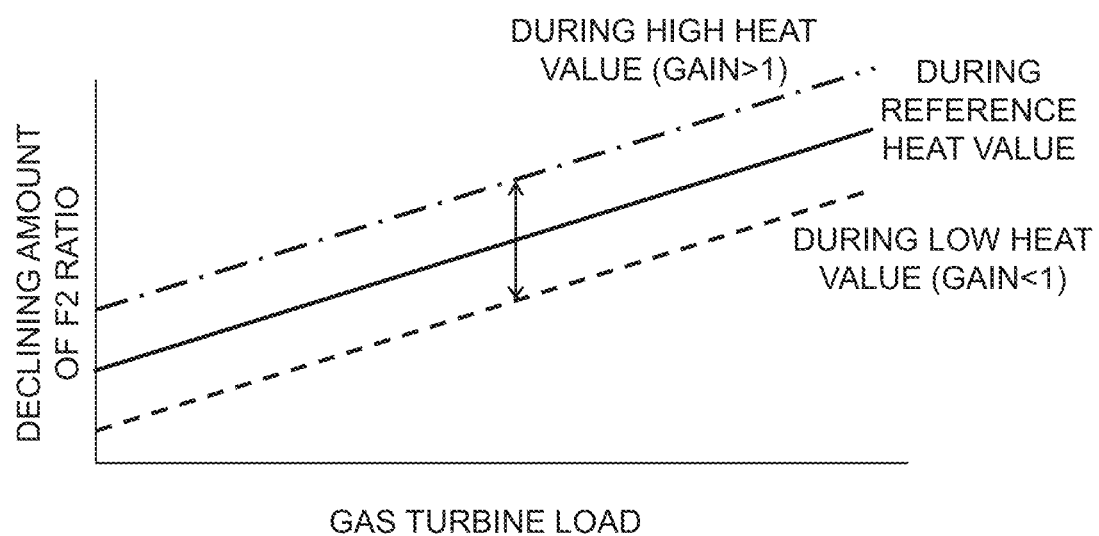
FIG. 14B is a characteristic diagram representing a relationship between a declining amount of a premixer fuel-air ratio and a gas turbine load under the premixed fuel ratio control in the gas turbine combustor according to the fifth embodiment of the present invention.
Figure 15A:
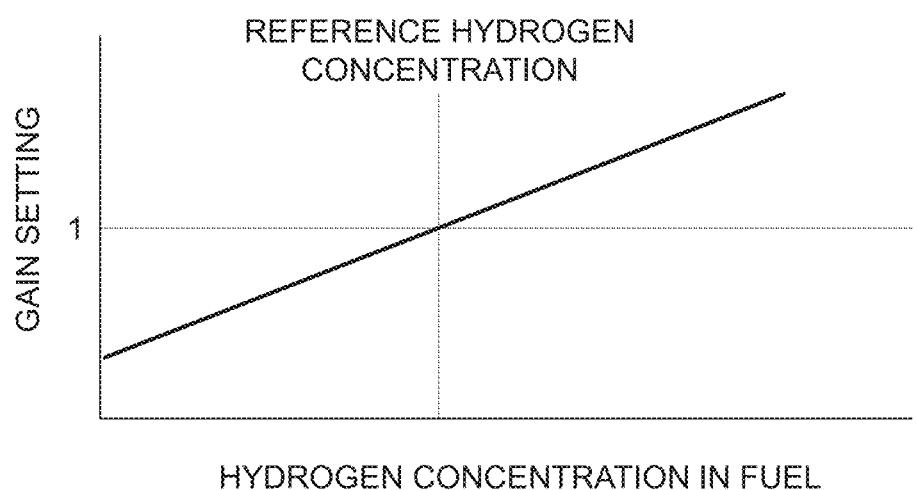
FIG. 15A is a characteristic diagram representing a relationship between hydrogen concentration in fuel and gain setting in premixed fuel ratio control in a gas turbine combustor according to a sixth embodiment of the present invention.
Figure 15B:
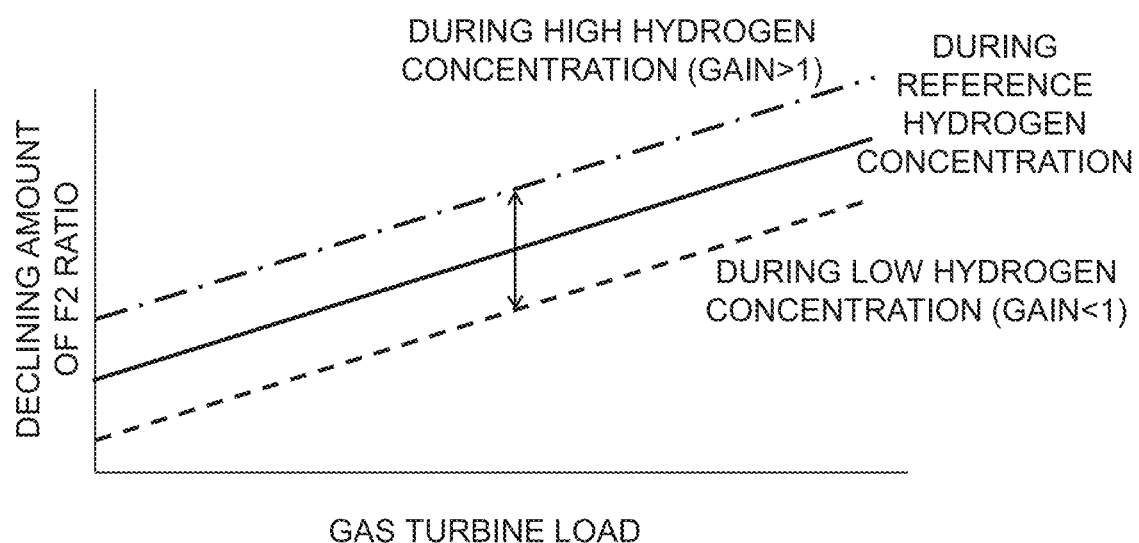
FIG. 15B is a characteristic diagram representing a relationship between a declining amount of a premixer fuel-air ratio and a gas turbine load under the premixed fuel ratio control in the gas turbine combustor according to the sixth embodiment of the present invention.

FIG. 14A is a characteristic diagram representing a relationship between a fuel heat value and gain setting and FIG. 14B is a characteristic diagram representing a relationship between a declining amount (correction amount) of a premixed fuel ratio and a gas turbine load under premixed fuel ratio control in a gas turbine combustor according to a fifth embodiment of the present invention. FIG. 14B corresponds to FIG. 9B. In the present embodiment, the control device 50 is configured to increase controlled variables of the first to fifth gas control valves 21A to 21E under the premixed fuel ratio control to be associated with an increase in a calorific value (fuel heat value) of the premixed fuel measured by the calorimeter 44 (FIG. 1). Specifically, data that specifies a relationship between the calorific value and the gain setting as depicted in FIG. 14A is stored in the correction value computing circuit 50a. While the declining amount of the premixed fuel ratio (correction amount of each valve opening) is computed in response to the gas turbine load in the present embodiment similarly to the second embodiment, the computed declining amount of the premixed fuel ratio (correction amount of each valve opening) is further corrected by being multiplied by a gain in response to the calorific value. While the relationship between the calorific value of the fuel and the gain is linearly set in the present embodiment, it is not always necessary to linearly set the relationship.

A reference value (reference heat value) is set in advance to the calorific value, and the gain is set to 1 in a case in which the measured calorific value is the reference value. In the case of gain=1, the correction value of each valve opening is computed on the basis of the declining amount of the premixed fuel ratio in response to the gas turbine load (value on a solid line of FIG. 14B). In a case in which the measured calorific value is higher than the reference value, the gain is set to a positive value having a magnitude in response to the calorific value as depicted in FIG. 14A. In this case, the declining amount of the premixed fuel ratio is corrected to be increased by being multiplied by the gain, and the correction value of each valve opening is computed on the basis of the declining amount of the premixed fuel ratio after correction (value on a dot-and-dash line of FIG. 14B). Conversely, in a case in which the measured calorific value is lower than the reference value, the gain is set to a negative value having a magnitude in response to the calorific value as depicted in FIG. 14A. In this case, the declining amount of the premixed fuel ratio is corrected to be reduced by being multiplied by the gain, and the correction amount of each valve opening is computed on the basis of the declining amount of the premixed fuel ratio after correction (value on a broken line of FIG. 14B).

The present embodiment is similar to the second embodiment in the other respects and can obtain similar effects to those of the second embodiment. In addition, the present embodiment can advantageously realize appropriate premixed fuel ratio control while flexibly dealing with an increase or a decrease in the calorific value of the fuel. For example, in a case in which the calorific value of the fuel unexpectedly increases, it is possible to ensure that the flame in one of the premixers 42f can be extinguished by more greatly reducing the flow rate of the premixed fuel. In addition, in a case in which the calorific value falls, it is possible to suppress the fluctuation in the combustion state and eventually suppress the temporary increase in the nitrogen oxides (NOx) emissions by holding down a reduction degree of the flow rate of the premixed fuel.

Sixth Embodiment

FIG. 15A is a characteristic diagram representing a relationship between a fuel hydrogen concentration and gain setting and FIG. 15B is a characteristic diagram representing a relationship between a declining amount (correction amount) of a premixed fuel ratio and a gas turbine load under premixed fuel ratio control in a gas turbine combustor according to a sixth embodiment of the present invention. In the present embodiment, the control device 50 is configured to increase controlled variables of the first to fifth gas control valves 21A to 21E under the premixed fuel ratio control to be associated with an increase in a hydrogen concentration of the premixed fuel measured by the concentration meter 45 (FIG. 1). Specifically, data that specifies a relationship between the hydrogen concentration and the gain setting as depicted in FIG. 15A is stored in the correction value computing circuit 50a. While the declining amount of the premixed fuel ratio (correction amount of each valve opening) is computed in response to the gas turbine load in the present embodiment similarly to the second embodiment, the computed declining amount of the premixed fuel ratio (correction amount of each valve opening) is further corrected by being multiplied by a gain in response to the hydrogen concentration. While the relationship between the hydrogen concentration of the fuel and the gain is linearly set in the present embodiment, it is not always necessary to linearly set the relationship. In sum, the present embodiment is similar to the fifth embodiment except that not the calorific value but the hydrogen concentration of the fuel is set in response to the gain.

A reference value (reference hydrogen concentration) is set in advance to the hydrogen concentration in a similar manner as the fifth embodiment, and the gain is set to 1 in a case in which the measured hydrogen concentration is the reference value. In the case of gain=1, the correction value of each valve opening is computed on the basis of the declining amount of the premixed fuel ratio in response to the gas turbine load (value on a solid line of FIG. 15B). In a case in which the measured hydrogen concentration is higher than the reference value, the gain is set to a positive value having a magnitude in response to the hydrogen concentration as depicted in FIG. 15A. In this case, the declining amount of the premixed fuel ratio is corrected to be increased by being multiplied by the gain, and the correction value of each valve opening is computed on the basis of the declining amount of the premixed fuel ratio after correction (value on a dot-and-dash line of FIG. 15B). Conversely, in a case in which the measured hydrogen concentration is lower than the reference value, the gain is set to a negative value having a magnitude in response to the hydrogen concentration as depicted in FIG. 15A. In this case, the declining amount of the premixed fuel ratio is corrected to be reduced by being multiplied by the gain, and the correction value of each valve opening is computed on the basis of the declining amount of the premixed fuel ratio after correction (value on a broken line of FIG. 15B).

The present embodiment can obtain similar effects to those of the second embodiment. In addition, the present embodiment can advantageously realize appropriate premixed fuel ratio control while flexibly dealing with an increase or a decrease in the hydrogen concentration of the fuel. For example, in a case in which the hydrogen concentration of the fuel unexpectedly increases, it is possible to ensure that the flame in one of the premixers 42f can be extinguished by more greatly reducing the flow rate of the premixed fuel. In addition, in a case in which the hydrogen concentration falls, it is possible to suppress the fluctuation in the combustion state and eventually suppress the temporary increase in the nitrogen oxides (NOx) emissions by holding down the reduction degree of the flow rate of the premixed fuel.

Seventh Embodiment

Figure 16:
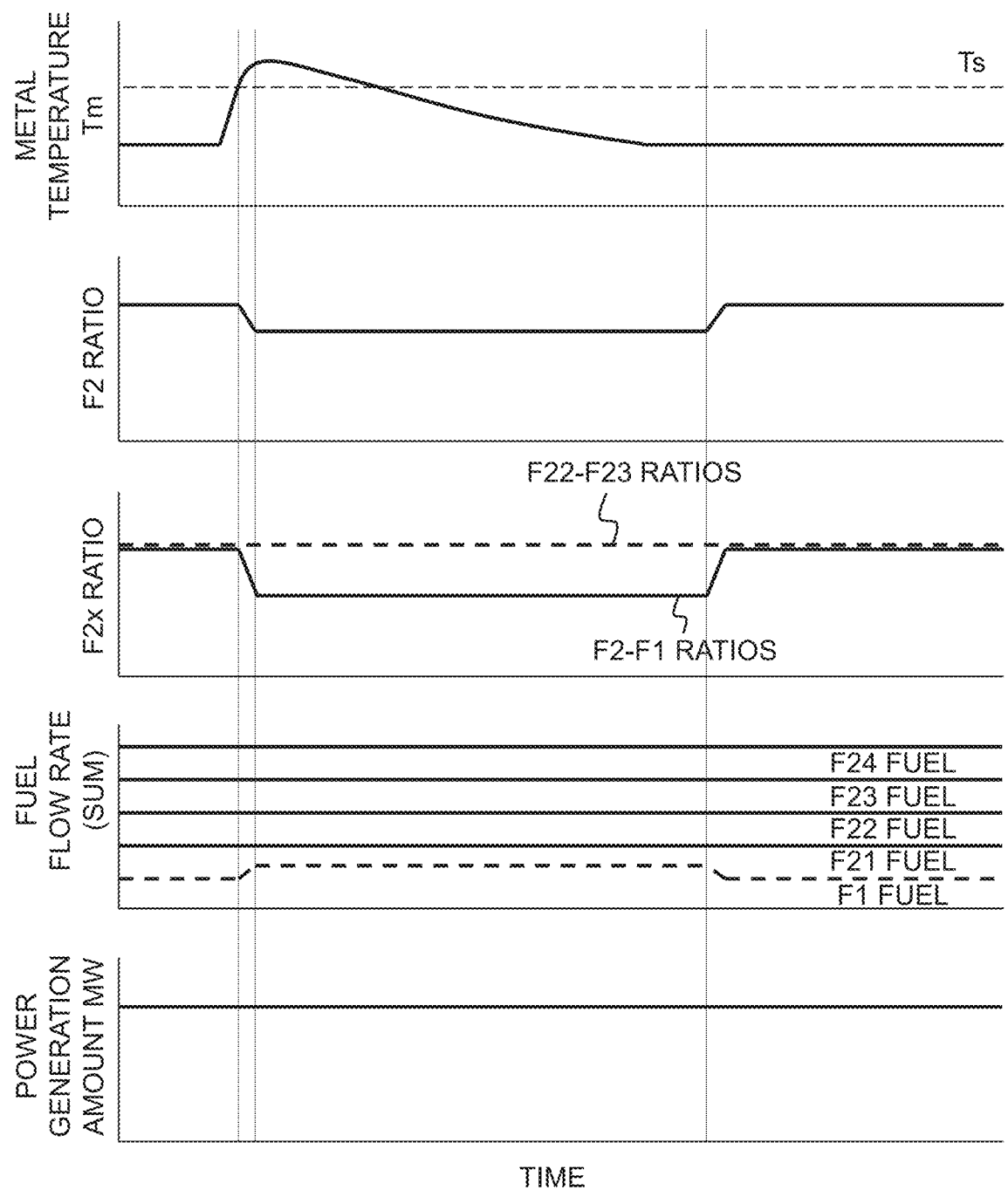
FIG. 16 is a characteristic diagram illustrating a burner metal temperature, a premixed fuel ratio, a fuel flow rate, and a power generation amount according to a seventh embodiment of the present invention.

FIG. 16 is a characteristic diagram illustrating a burner metal temperature, a premixed fuel ratio, a fuel flow rate, and a power generation amount according to a seventh embodiment of the present invention, and corresponds to FIG. 7 according to the first invention. While the premixed fuel ratio is reduced by uniformly reducing the flow rates of the fuels supplied to the partial burners 42A to 42D when it is detected that a flame has been produced in one of the premixers 42f in the first to sixth embodiments, only the flow rate of the fuel to the partial burner where a flame has been produced is reduced in the present embodiment.

In the present embodiment, a plurality of thermometers 42e are essential and one thermometer 42e is provided in at least one vane 42d for each of the plurality of partial burners 42A to 42D. Particularly in the present embodiment, the thermometers 42e are alternately provided in the 12 vanes 42d in the circumferential direction, that is, one thermometer 42e is provided in each of the six vanes 42d in total. In other words, the number of thermometers 42e is six.

In a case in which the detected temperature Tm by at least one thermometer 42e exceeds the set value Ts, the control device 50 determines the partial burner (any one of the partial burners 42A to 42D) where a flame has been detected, reduces the opening of the corresponding premixed fuel gas control valve (any one of the second to fifth gas control valves 21B to 21E), and reduces the premixed fuel ratio of the partial burner. The control device 50 controls the opening of one premixed fuel gas control valve (any one of the second to fifth gas control valves 21B to 21E) in a case in which the number of partial burners in which a flame is estimated to have been produced is one, and controls the openings of a plurality of premixed fuel gas control valves (two or more out of the second to fifth gas control valves 21B to 21E) in a case in which the number of partial burners in which a flame is estimated to have been produced is two or more. At the same time, the control device 50 increases the opening of the diffusion gas control valve 21A and increases the flow rate of the diffusion fuel to maintain the sum of the fuels supplied to the burner 5. Procedures for the control exercised by the control device 50 in the present embodiment are similar to those in the first embodiment except that the premixed fuel ratio control is exercised in units of the partial burners.

For example, in a case in which the thermometer 42e outputting the detected temperature Tm which exceeds the set value Ts belongs to the partial burner 42A, the opening of the second gas control valve 21B corresponding to the partial burner 42A to which the thermometer 42e belongs is reduced as depicted in FIG. 16. During this time, the openings of the third to fifth gas control valves 21C to 21E corresponding to the other partial burners 42B to 42D are maintained. At the same time, the opening of the first gas control valve 21A is increased in response to the decrement of the flow rate of the premixed fuel so that the sum of the flow rates of the fuels supplied to the burner 5 remains unchanged.

As for the other respects, the present embodiment can obtain similar effects to those of the first embodiment. In addition, the present embodiment can advantageously limit the control over the premixed fuel ratio to a necessary part and maintain fuel states in the partial burners where it is unnecessary to reduce the premixed fuel ratio. It is thereby possible to suppress the change in the combustion state and eventually the temporary increase in the nitrogen oxides (NOx) emissions as much as possible.

In a case in which the detected temperature Tm of the thermometer 42e provided in the vane 42d that separates the adjacent partial burners increases, it is impossible to estimate a flame has been produced in which of the partial burners only using the detected temperature Tm. However, a combination of the above detected temperature Tm with the detected temperature Tm of the other thermometer 42e makes it possible to identify the partial burner where a flame is estimated to have been produced. Alternately providing the thermometers 42e in the vanes 42d is advantageous in that the number of thermometers 42e can be made half of the number of thermometers 42e installed in all the vanes 42d while it is possible to ensure certain identification accuracy for the partial burner where a flame is estimated to have been produced.

Modification

When a flame is produced in one premixer 42f, a fluid oscillation (pressure wave) becomes greater. Providing, for example, a pressure gauge in the premixer and detecting this fluid oscillation makes it possible to expect improvement in flame detection accuracy, compared with a case of detecting that a flame has been produced only using the detected temperature Tm. Furthermore, the embodiments described above can be combined as appropriate. For example, the control device 50 can control the premixed fuel ratio in units of the partial burners by combining the first to sixth embodiments with the seventh embodiment. In addition, an example of combining the fifth and sixth embodiments and correcting the controlled variable of the premixed fuel ratio on the basis of the two factors, that is, the calorific value of the fuel and the hydrogen concentration of the fuel is conceivable. Furthermore, an example of applying the fourth embodiment to the other embodiments and executing the premixed fuel ratio control and the return control using the change rate ΔTm as an alternative to the detected temperature Tm is conceivable.

What is claimed is:

1. A gas turbine combustor comprising:
   a diffusion burner;
   a diffusion gas control valve provided in a diffusion fuel system for the diffusion burner;
   a premixed burner;
   at least one premixed gas control valve provided in a premixed fuel system for the premixed burner;
   a combustion liner that forms a combustion chamber downstream, in a fuel injection direction, of the diffusion burner and the premixed burner; and
   a control device that controls the diffusion gas control valve and the premixed gas control valve, wherein the premixed burner includes:
      a burner liner that surrounds the diffusion burner;
      a burner casing that surrounds the burner liner;
      a plurality of vanes that separate a cylindrical space between the burner liner and the burner casing into a plurality of premixers arranged side by side in a circumferential direction;
      a plurality of premixed fuel nozzles that are connected to the premixed fuel system and that inject a premixed fuel to the corresponding premixers; and
      at least one thermometer installed to be buried in one of the vanes, wherein
   the control device is configured such that, when a detection value of the at least one thermometer or an increase rate of the detection value exceeds a corresponding set value, the control device executes premixed fuel ratio control to reduce an opening of the premixed gas control valve and to increase an opening of the diffusion gas control valve in such a manner that a sum of flow rates of fuels supplied to the diffusion burner and the premixed burner remains unchanged.

2. The gas turbine combustor according to claim 1, wherein
   the at least one thermometer is provided in the one of the vanes in such a manner that a measuring section of the at least one thermometer is located in an intermediate portion between an end portion, near the combustion chamber, of the one vane and fuel jet holes of the premixed fuel nozzles in the fuel injection direction of the premixed fuel nozzles.

3. The gas turbine combustor according to claim 1, wherein
   a flame stabilizer is provided in the premixed burner near the combustion chamber, and
   the vanes are planar members in parallel to a central axis of the combustion chamber.

4. The gas turbine combustor according to claim 1, wherein
   the control device is configured such that, when a set time elapses since the detection value of the at least one thermometer falls below the set value after execution of the premixed fuel ratio control, the control device executes return control to return the opening of each of the premixed gas control valve and the diffusion gas control valve to a value before execution of the premixed fuel ratio control.

5. The gas turbine combustor according to claim 1, wherein
   the control device is configured to increase controlled variables of the diffusion gas control valve and the premixed gas control valve under the premixed fuel ratio control to increase a load of the gas turbine.

6. The gas turbine combustor according to claim 1, wherein
   a plurality of values having different magnitudes are set as the set value, and
   controlled variables of the diffusion gas control valve and the premixed gas control valve are set to correspond to each of the plurality of values, and the control device is configured to execute the premixed fuel ratio control stepwise.

7. The gas turbine combustor according to claim 1, wherein
   a calorimeter that measures a calorific value of the premixed fuel is provided, and the control device is configured to increase controlled variables of the diffusion gas control valve and the premixed gas control valve under the premixed fuel ratio control to increase the calorific value of the premixed fuel measured by the calorimeter.

8. The gas turbine combustor according to claim 1, wherein
a concentration meter that measures a hydrogen concentration of the premixed fuel is provided, and
the control device is configured to increase controlled variables of the diffusion gas control valve and the premixed gas control valve under the premixed fuel ratio control to be associated with an increase in the hydrogen concentration of the premixed fuel measured by the concentration meter.

9. The gas turbine combustor according to claim 1, wherein
the premixed burner is partitioned into a plurality of partial burners each including at least a set of the premixer and the premixed fuel nozzles and arranged side by side in a circumferential direction to surround the diffusion burner, wherein each of the plurality of partial burners includes a corresponding premixed gas control valve,
the at least one thermometer comprises a plurality of thermometers and at least one of the plurality of thermometers are provided in at least one of the vanes for each of the plurality of partial burners, and
the control device is configured such that, when a detection value of at least one of the plurality of thermometers exceeds the set value, the control deice reduces the opening of the premixed gas control valve corresponding to the at least one of the partial burners to which the thermometer outputting the detection value which exceeds the set value belongs, to maintain the opening of the premixed gas control valve corresponding to each of other partial burners, and to increase the opening of the diffusion gas control valve in such a manner that the sum of the flow rates of the fuels supplied to the diffusion burner and the premixed burner remains unchanged.

10. A gas turbine comprising:
a compressor;
the gas turbine combustor according to claim 1, the gas turbine combustor burning the fuel together with air compressed by the compressor; and
a turbine driven by combustion gas produced by the gas turbine combustor.

11. A control method for a gas turbine combustor, the gas turbine combustor including a diffusion burner; a diffusion gas control valve provided in a diffusion fuel system for the diffusion burner; a premixed burner; at least one premixed gas control valve provided in a premixed fuel system for the premixed burner; and a combustion chamber provided downstream, in a fuel injection direction, of the diffusion burner and the premixed burner, wherein
the premixed burner is configured to include:
a burner liner that surrounds the diffusion burner;
a burner casing that surrounds the burner liner;
a plurality of vanes that separate a cylindrical space between the burner liner and the burner casing into a plurality of premixers arranged side by side in a circumferential direction;
a plurality of premixed fuel nozzles that are connected to the premixed fuel system and that inject a premixed fuel to the corresponding premixers; and
at least one thermometer installed to be buried in one of the vanes, wherein
when a detection value of the at least one thermometer or an increase rate of the detection value exceeds a corresponding set value, an opening of the premixed gas control valve is reduced and an opening of the diffusion gas control valve is increased in such a manner that a sum of flow rates of fuels supplied to the diffusion burner and the premixed burner remains unchanged.

* * * * *